(12) United States Patent
Tseng et al.

(10) Patent No.: US 11,457,431 B2
(45) Date of Patent: Sep. 27, 2022

(54) SIDELINK RADIO RESOURCE ALLOCATION

(71) Applicant: FG Innovation Company Limited, Tuen Mun (CN)

(72) Inventors: Yung-Lan Tseng, Hsinchu (TW); Mei-Ju Shih, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/529,054

(22) Filed: Aug. 1, 2019

(65) Prior Publication Data

US 2020/0045674 A1 Feb. 6, 2020

Related U.S. Application Data

(60) Provisional application No. 62/714,237, filed on Aug. 3, 2018.

(51) Int. Cl.
*H04W 72/04* (2009.01)
*H04W 76/19* (2018.01)

(52) U.S. Cl.
CPC ........... *H04W 72/04* (2013.01); *H04W 76/19* (2018.02)

(58) Field of Classification Search
None
See application file for complete search history.

(56) References Cited

U.S. PATENT DOCUMENTS

| 2015/0222401 A1 | 8/2015 | Xu et al. | |
| 2016/0088541 A1* | 3/2016 | Quan | H04W 72/042 370/331 |
| 2017/0034825 A1* | 2/2017 | Harada | H04W 8/005 |
| 2017/0251500 A1* | 8/2017 | Agiwal | H04W 74/0833 |
| 2017/0290028 A1* | 10/2017 | Lee | H04W 72/14 |

(Continued)

FOREIGN PATENT DOCUMENTS

| CN | 104780609 A | 7/2015 |
| CN | 106464703 A | 2/2017 |
| WO | 2016107205 A1 | 7/2016 |

OTHER PUBLICATIONS

Intel Corporation Sidelink Resource Pool Sharing for eNB-Controlled and UE-Autonomous V2V Transmission Modes 3GPP TSG RAN WG1 Meeting #92bis, R1-1804690 Apr. 20, 2018 (Apr. 20, 2018) the whole document.

*Primary Examiner* — Adnan Baig
(74) *Attorney, Agent, or Firm* — ScienBiziP, P.C.

(57) ABSTRACT

A method for a first user equipment (UE) to exchange one or more sidelink packets with a second UE. The method receives, from a serving base station, a sidelink resource allocation configuration that includes i) one or more sidelink resource configurations on one or more sidelink frequency carriers, and (ii) data identifying a valid area of the sidelink resource configurations. The method determines, based on the data identifying the valid area, whether the first UE is located within the valid area. If the method determines that the first UE is located within the valid area, the method exchanges the one or more sidelink packets with the second UE based on the received sidelink resource allocation configuration, otherwise, the method stops exchanging the one or more sidelink packets, on one or more sidelink resources indicated by the sidelink resource configurations, with the second UE.

14 Claims, 11 Drawing Sheets

(56) References Cited

U.S. PATENT DOCUMENTS

| | | | |
|---|---|---|---|
| 2017/0332372 A1* | 11/2017 | Lee | H04W 72/085 |
| 2018/0139778 A1 | 5/2018 | Chou et al. | |
| 2018/0199251 A1 | 7/2018 | Kim et al. | |
| 2018/0302889 A1* | 10/2018 | Guo | H04B 7/088 |
| 2018/0359735 A1* | 12/2018 | Lee | H04W 72/0406 |
| 2018/0368191 A1* | 12/2018 | Vutukuri | H04W 4/70 |
| 2019/0037622 A1* | 1/2019 | Blasco Serrano | H04W 76/14 |
| 2019/0254107 A1* | 8/2019 | Stattin | H04W 76/36 |
| 2020/0029262 A1* | 1/2020 | Kim | H04W 36/0094 |
| 2020/0100253 A1* | 3/2020 | Liu | H04W 76/11 |
| 2021/0099847 A1* | 4/2021 | Uchiyama | H04B 17/345 |

* cited by examiner

SIDELINK RADIO RESOURCE ALLOCATION

CROSS-REFERENCE TO RELATED APPLICATION(S)

The present application claims the benefit of and priority to a provisional U.S. Patent Application Ser. No. 62/714,237, filed on Aug. 3, 2018, entitled "Sidelink Operation for NR V2X UE," (hereinafter referred to as "US74662 application"). The disclosure of the US74662 application is hereby incorporated fully by reference into the present application.

FIELD

The present disclosure generally relates to wireless communications, and more particularly, to sidelink radio resource allocation in the next generation wireless networks.

BACKGROUND

In new radio (NR), a user equipment (UE) may exchange sidelink data (e.g., user data and control signaling) with other UEs directly and without the help (e.g., relaying) of a base station. In order to perform sidelink operations, however, the UE needs to receive the sidelink configuration and resource allocation from a base station (e.g., from one or more cells associated with the base station) beforehand. Additionally, the next generation wireless network (e.g., a 5$^{th}$ generation (5G) NR network) includes numerous additional (or improved) features (e.g., a UE transitioning to a radio resource control (RRC) Inactive state frequently) that need to be addressed in sidelink communications. There is a need in the industry for an improved and efficient sidelink resource allocation process in the next generation wireless networks.

SUMMARY

The present disclosure is directed to sidelink radio resource allocation in the next generation wireless networks.

In a first aspect of the present application, a method for scheduling sidelink radio resources for a first user equipment (UE) to exchange one or more sidelink packets with a second UE is provided. The method comprises receiving, at the first UE, from a serving base station, a sidelink resource allocation configuration, wherein the sidelink resource allocation configuration comprises (i) one or more sidelink resource configurations on one or more sidelink frequency carriers, and (ii) data specifying a validity area (also referred to as valid area hereinafter) configuration represented by at least one of the following identifiers: one or more than one cell identities, one or more than one radio access network (RAN)-area codes, one or more than one tracking area codes, and one or more than one system information area identifiers; determining, based on the identification data identifying the valid area, whether the first UE is located within the valid area; exchanging the one or more sidelink packets with the second UE, based on the received sidelink resource allocation configuration, after determining that the first UE is located within the valid area; and stop exchanging the one or more sidelink packets with the second UE after determining that the first UE is located outside the valid area.

In an implementation of the first aspect, receiving the sidelink resource allocation configuration comprises receiving, from the serving base station, the sidelink resource allocation configuration via at least one of: a radio resource control (RRC) Connection Resume Response message during an RRC Connection Resume procedure, an RRC Release message to transition from an RRC Connected state to an RRC Inactive state, and broadcasting system information.

In another implementation of the first aspect, the sidelink resource allocation configuration comprises one or more sidelink configured grants in at least one sidelink bandwidth part (BWP), wherein the first UE exchanges the one or more sidelink packets with the second UE while the first UE is in an RRC Inactive state.

In another implementation of the first aspect, the sidelink resource allocation configuration comprises one or more sidelink resource pool configurations in at least one sidelink bandwidth part (BWP), wherein the first UE exchanges the one or more sidelink packets with the second UE autonomously based on a configured sidelink resource pool.

In another implementation of the first aspect, the sidelink resource pool comprises one or more exceptional resource pools in the at least one sidelink BWP, wherein the first UE exchanges the one or more sidelink packets with the second UE autonomously during an exceptional condition, wherein the exceptional condition comprises at least one of the first UE performing a beam failure recovery procedure, and the first UE performing an RRC Connection Resume procedure.

Another implementation of the first aspect further comprises transmitting a sidelink resource request message to the serving base station during an RRC connection resume procedure.

In another implementation of the first aspect, the first UE is in an RRC inactive state while exchanging the one or more sidelink packets with the second UE, the method further comprising transmitting an RRC Connection Resume Request message to the serving base station for requesting updated sidelink configuration; and transmitting at least one of a sidelink configuration update request and sidelink supporting information to the serving base station.

In a second aspect of the present application, a method for a base station for scheduling sidelink radio resources to a first user equipment (UE) to exchange one or more sidelink packets with a second UE is provided. The method comprises transmitting, from the base station, a sidelink resource allocation configuration to the first UE, wherein the sidelink resource allocation configuration comprises (i) one or more sidelink resource configurations on one or more sidelink frequency carriers, and (ii) data identifying a valid area represented by at least one of the following identifiers: one or more than one Cell identities, one or more than one radio access network (RAN)-area codes, one or more than one tracking area codes, and one or more than one system Information Area identifier, wherein the first UE determines, based on the identification data identifying the valid area, whether the first UE is located within the valid area, exchanges the one or more sidelink packets with the second UE, based on the transmitted sidelink resource allocation configuration, after determining that the first UE is located within the valid area, and stops exchanging the one or more sidelink packets with the second UE after determining that the first UE is located outside the valid area.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
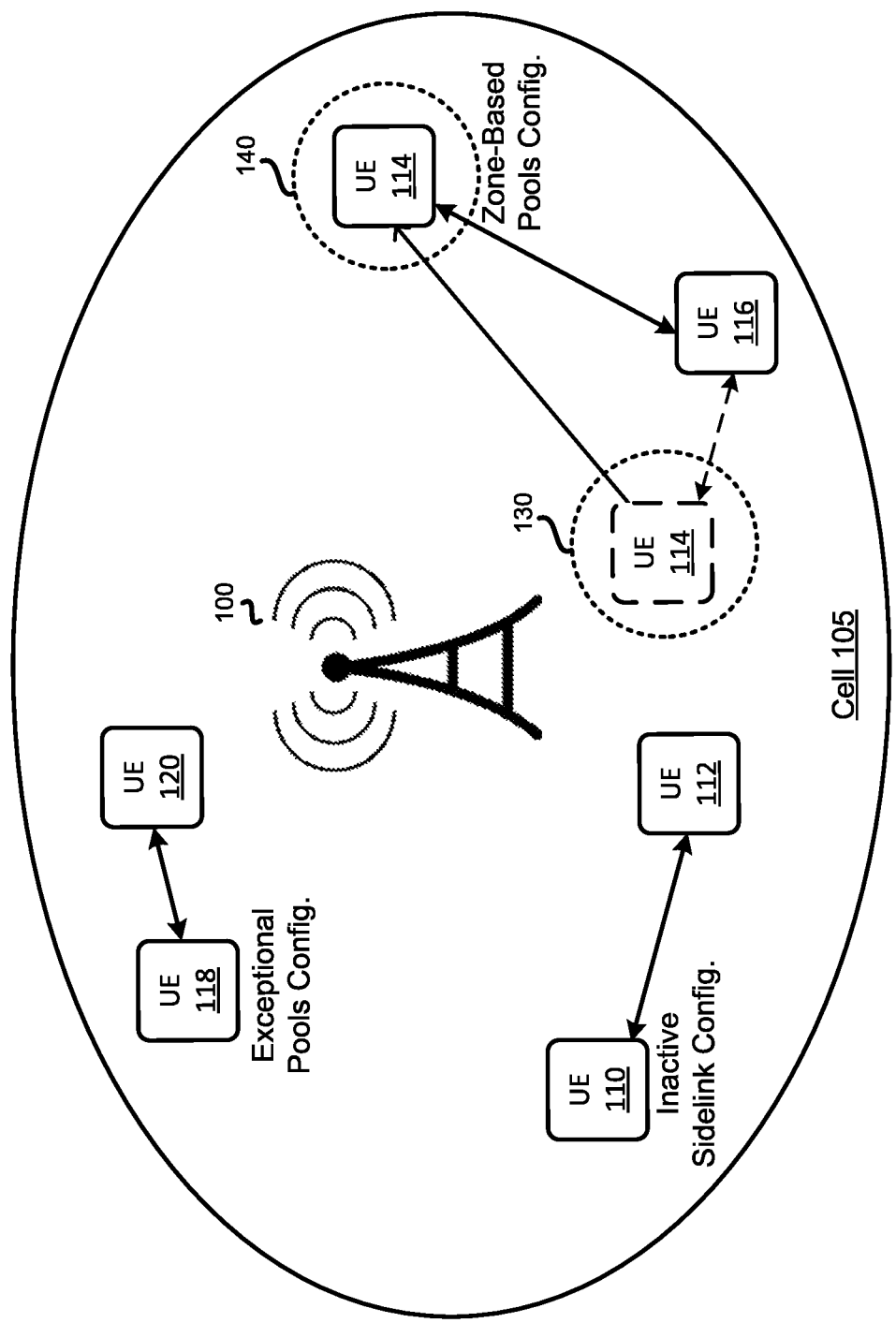
FIG. 1 is a map of a cell coverage area illustrating sidelink communications between several UEs within the cell coverage area, according to an example implementation of the present application.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

The term "and/or" herein is only an association relationship for describing associated objects, and represents that three relationships may exist, for example, A and/or B may represent that: A exists alone, A and B exist at the same time, and B exists alone. In addition, the character "/" used herein generally represents that the former and latter associated objects are in an "or" relationship.

Furthermore, combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Persons skilled in the art will immediately recognize that any network function(s) or algorithm(s) described in the present disclosure may be implemented by hardware, software or a combination of software and hardware. Described functions may correspond to modules that may be software, hardware, firmware, or any combination thereof. The software implementation may comprise computer executable instructions stored on computer readable medium such as memory or other type of storage devices. For example, one or more microprocessors or general purpose computers with communication processing capability may be programmed with corresponding executable instructions and carry out the described network function(s) or algorithm(s). The microprocessors or general purpose computers may be formed of Applications Specific Integrated Circuitry (ASIC), programmable logic arrays, and/or using one or more digital signal processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to random access memory (RAM), read only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

A radio communication network architecture (e.g., a long term evolution (LTE) system, an LTE-Advanced (LTE-A) system, or an LTE-Advanced Pro system) typically includes at least one base station, at least one UE, and one or more optional network elements that provide connection towards a network. The UE communicates with the network (e.g., a CN, an evolved packet core (EPC) network, an Evolved Universal Terrestrial Radio Access network (E-UTRAN), a Next-Generation Core (NGC), a 5G Core Network (5GC), or an internet), through a radio access network (RAN) established by the base station.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE is configured to receive and transmit signals over an air interface to one or more cells in a radio access network.

A base station may include, but is not limited to, a node B (NB) as in the Universal Mobile Telecommunication System (UMTS), an evolved node B (eNB) as in the LTE-A, a Radio Network Controller (RNC) as in the UMTS, a Base Station Controller (BSC) as in the Global System for Mobile communications (GSM)/GSM EDGE Radio Access Network (GERAN), an ng-eNB as in an E-UTRA base station in connection with the 5GC, a next generation node B (gNB) as in the 5G Access Network (5G-AN), and any other apparatus capable of controlling radio communication and managing radio resources within a cell. The base station may connect to serve the one or more UEs through a radio interface to the network.

A base station may be configured to provide communication services according to at least one of the following Radio Access Technologies (RATs): Worldwide Interoperability for Microwave Access (WiMAX), GSM (often referred to as 2G), GERAN, General Packet Radio Service (GRPS), UMTS (often referred to as 3G) based on basic Wideband-Code Division Multiple Access (W-CDMA), High-Speed Packet Access (HSPA), LTE, LTE-A, eLTE, NR, and LTE-A Pro. However, the scope of the present application should not be limited to the above mentioned protocols.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage, (e.g., each cell schedules the downlink and optionally uplink/sidelink resources to at least one UE within its radio coverage for downlink and optionally uplink packet transmissions). The base station can communicate with one or more UEs in the radio communication system through the plurality of cells. A cell may allocate sidelink (SL) resources for supporting proximity service (ProSe).

Each cell may have overlapped coverage areas with other cells. In MR-DC (Multi-Radio Dual Connectivity) cases, the primary cell of an MCG or a primary secondary cell of an SCG may be called a special cell (SpCell). So, a PCell may refer to the SpCell of an MCG, while a PSCell may refer to the SpCell of an SCG. An MCG may include a group of serving cells associated with the MN, comprising of the SpCell and optionally one or more secondary cells (SCells). An SCG may include a group of serving cells associated with the SN, comprising of the SpCell and optionally one or more SCells.

As discussed above, the frame structure for NR is to support flexible configurations for accommodating various next generation (e.g., 5G) communication requirements, such as enhanced mobile broadband (eMBB), massive machine type communication (mMTC), ultra-reliable communication and low latency communication (URLLC), while fulfilling high reliability, high data rate and low latency requirements. The orthogonal frequency-division multiplexing (OFDM) technology as agreed in the 3rd Generation Partnership Project (3GPP) may serve as a baseline for NR waveform. The scalable OFDM numerology, such as the adaptive sub-carrier spacing, the channel bandwidth, and the Cyclic Prefix (CP), may also be used. Additionally, two coding schemes are considered for NR: (1) low-density parity-check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resource may also be provided in an NR frame to support ProSe services.

As discussed above, in NR, a UE may communicate (e.g., exchange user and control data) with other UEs without involvement of a serving cell (or base station). To perform sidelink operations (i.e., to exchange data with other UEs), a UE may need to receive sidelink (SL) configuration and resource allocation from the base station. Some aspects of the present implementations provide a method of SL resource allocation for scheduling SL resources for a UE that is in an RRC Inactive state. In some other aspects of the present implementations, an area-based (or zone-based) SL pool allocation method may provide different SL resources to a UE (e.g., a moving UE) based on the location of the UE. In yet other aspects of the present implementations, the SL resource allocation method may leverage SL exceptional pools resources when an exceptional condition occurs.

FIG. 1 is a map of a cell coverage area illustrating sidelink communications between several UEs within the cell coverage area, according to an example implementation of the present application. FIG. 1 includes a base station 100 (e.g., a gNB or an eNB) with a cell coverage area 105, and six different UEs 110-120. As shown in FIG. 1, each pair of the UEs (e.g., UEs 110 and 112, UEs 114 and 16, and UEs 118 and 120) are in sidelink communication with each other (e.g., without the base station 100 relaying each pair of the UEs' communication) within the cell coverage area 105 of the base station 100.

The UE 110 is in an RRC Inactive state, while the UE 110 is exchanging sidelink data with the UE 112. To do so, the base station 100 has provided SL resource allocation configuration to the UE 110, for example, before the UE 110 transitioned (from an RRC Connected state) to the RRC Inactive state. As will be described in more detail below, in some of the present implementations, the base station 100 may configure both sidelink configured grant resources and resource pool sidelink resources to the UE, so that the UE be able to perform sidelink communications even when the UE is in the RRC Inactive state. As such, the UE 110 uses the SL resources specified in the configuration to exchange sidelink data with the UE 112, while the UE 110 is in the RRC Inactive state.

The UE 114, as shown in FIG. 1, has moved from an area (or zone) 130 to an area (or zone) 140 within the cell coverage area 105. The UE 114 may have started communicating sidelink data with the UE 116 when the UE 114 was originally located in the zone 130. After determining that the UE 114 has moved to zone 140 (e.g., through positioning information provided by a Global Navigation Satellite System (GNSS) and/or a Global Positioning System (GPS) of the UE), the UE 114 may continue exchanging sidelink packets with the UE 116, while the UE 114 is in the zone 140, using the resources provided in the zone-based SL resource pools configuration received from the base station 100. As will be described in more detail below, some of the present implementations may perform a zone-based validity check, based on the received configuration, in order to determine whether the second zone 140 is a valid area for sidelink communications or not.

The UE 118 may determine that an exceptional condition (e.g., a beam failure with the RAN, a radio link failure with the serving cell, etc.) has occurred, based on which the UE 118 has to stop sidelink communication with other UEs, such as the UE 120. In some of the present implementations, as will be described in more detail below, the network (RAN) may (pre)configure 'Exceptional SL-Pools' to the UEs, e.g., through dedicated RRC signaling, such that the UEs may be allowed to transmit/receive SL packets based on Exceptional SL resource pool when at least one of the exceptional conditions has occurred. Therefore, based on the exceptional sidelink pools resource allocation configuration received by the UE 118, this UE may use SL resources that are valid under the occurred exceptional condition.

Sidelink configuration may include basic settings, such as SL synchronization configuration, SL discovery settings, SL communication settings, etc. A base station (e.g., a serving cell of the base station) may deliver the SL configuration through broadcasting signaling (e.g. through System Information Block 18 (SIB18) or SIB19 for public safety services, SIB21 or SIB26 for Vehicle-to-Everything (V2X) services, etc.) and/or dedicated signaling (e.g. in an RRC-ConnectionReconfiguration message). For SL resource allocation, the resources (e.g., time and frequency) may be provided to a UE either via scheduled resource allocation (also referred to as mode 1 resource allocation, or configured grant allocation), or the UE may autonomously select the resources from a resource pool (also referred to as mode 2 resource allocation, or resource pools allocation).

In mode 1, The UE may need to be in an RRC Connected state in order to request SL resources from the base station (e.g., an eNB). The base station may then schedule the SL resources for transmission of sidelink control and user data. In mode 2, on the other hand, a UE may select the resources from a resource pool (that is configured to the UE before), while the UE is in an RRC Connected state (e.g., through dedicated RRC signalling or through system information broadcasting), or in an RRC Idle/Inactive state (e.g. through system information broadcasting). The UE, in mode 2, may independently (from the base station) select the resources from a resource pool and then perform transport format selection to transmit sidelink control and user data.

A resource pool is a set of (virtually continuous) resource blocks from which a UE may decide which physical resource blocks to select (e.g., for SL packet transmission) autonomously. One sidelink resource pool may include both physical sidelink control channel (PSCCH) and physical sidelink shared channel (PSSCH). In addition, a sidelink resource pool (and the corresponding PSCCH and PSSCH) may be configured periodically in the time domain. A transmitting (Tx) UE may deliver the sidelink control information (SCI) to one or more potential receiving (Rx) UEs. The Rx UE(s) may identify whether there is any sidelink packets required by the Rx UE(s) by decoding the PSCCH in the corresponding sidelink resource pools.

It should be noted that other UEs may also determine the distribution of occupied sidelink resource blocks by monitoring the PSCCH. As such, one potential Tx UE may select the available sidelink resource blocks and rule out those sidelink resource blocks that are occupied and reserved by the other Tx UEs. The Tx UEs may transmit the SCI in the PSCCH. The SCI may disclose the occupied physical resource blocks and the intended reservation times (in the time domain) in the sidelink resource pools. A Tx UE may also monitor the PSCCH to decode the SCIs transmitted by other Tx UEs before transmitting the SCI. Therefore, the UE may identify the available sidelink resources on the target sidelink resource pools by decoding the SCIs delivered on the PSCCH. The SCI may include 'intended occupied sidelink resource blocks,' 'Resource Reservation' and 'Priority of the highest MAC subPDU in the MAC PDU scheduled to be transmitted in the indicated occupied sidelink resource blocks' to indicate the locations and number of times a corresponding Tx UE may keep occupying the indicated sidelink resource blocks in the following resource pools (in the time domain).

A UE may also perform sensing (e.g., identifying the available sidelink resources on one or more concerned sidelink resource pools, e.g., by decoding the PSSCH) for selection/reselection of sidelink resources before any SL packet delivery. Based on the sensing results, the UE may (re)select some specific SL resources and reserve multiple sidelink resources. In some implementations, up to two parallel independent resource reservation processes may be allowed by the UE to be perform. The UE may also be allowed to perform a single resource selection for the UE's V2X sidelink transmission.

Additionally, two or more UEs that belong to a same proximity service (ProSe) group may communicate (e.g., exchange sidelink packages) with each other directly. The UEs in this type of group-based communication may be grouped together by application layer (e.g., V2X application layer), non-access stratum (NAS) or by access stratum (AS). Each ProSe group may be configured with a unique ProSe group ID. In addition, in some of the present implementations, the ProSe group ID may be configured by the upper layers (e.g., V2X application layer or NAS layer) and another Layer-2/Layer-1 ProSe group ID may be derived in the lower layers (e.g., Layer-2, such as MAC layer, or Layer-1, such as PHY layer) based on the ProSe group ID for the lower layers of the UEs and RAN to identify each ProSe group based on the derived Layer-2/Layer-1 ProSe group ID. As such, the UEs, RAN, and core network may identify each ProSe group based on the unique ID that is assigned to the ProSe group.

In the example implementations described below, even though several approaches for sidelink radio resource allocation for NR UEs (e.g., NR V2X UEs) are discussed in connection with the SL resource allocation by dedicated RRC signaling, the described implementations are not limited to the RRC states of the NR UEs. For example, some of the present implementations may equally apply to the LTE light connection operations (e.g., when light connection mode is jointly considered in V2X services) or when the RRC Connection of the UE is suspended by the instruction from the serving cell. As such, the described implementations may equally apply to both NR V2X UEs and LTE V2X UEs. Additionally, even though some of the implementations described below describe a UE in an RRC Inactive state, the present implementations may equally apply to UEs in other RRC states, such as the RRC Connected state and the RRC Idle state.

Additionally, the present implementations may also cover the inter-RAT scenarios and/or intra-RAT scenarios, such as an NR cell configuring NR sidelink resource allocation configuration to a UE, an NR cell configuring LTE sidelink resource allocation configuration to a UE, an LTE cell configuring NR sidelink resource allocation configuration to a UE, an LTE cell configuring LTE sidelink resource allocation configuration to a UE, etc.

Figure 2:
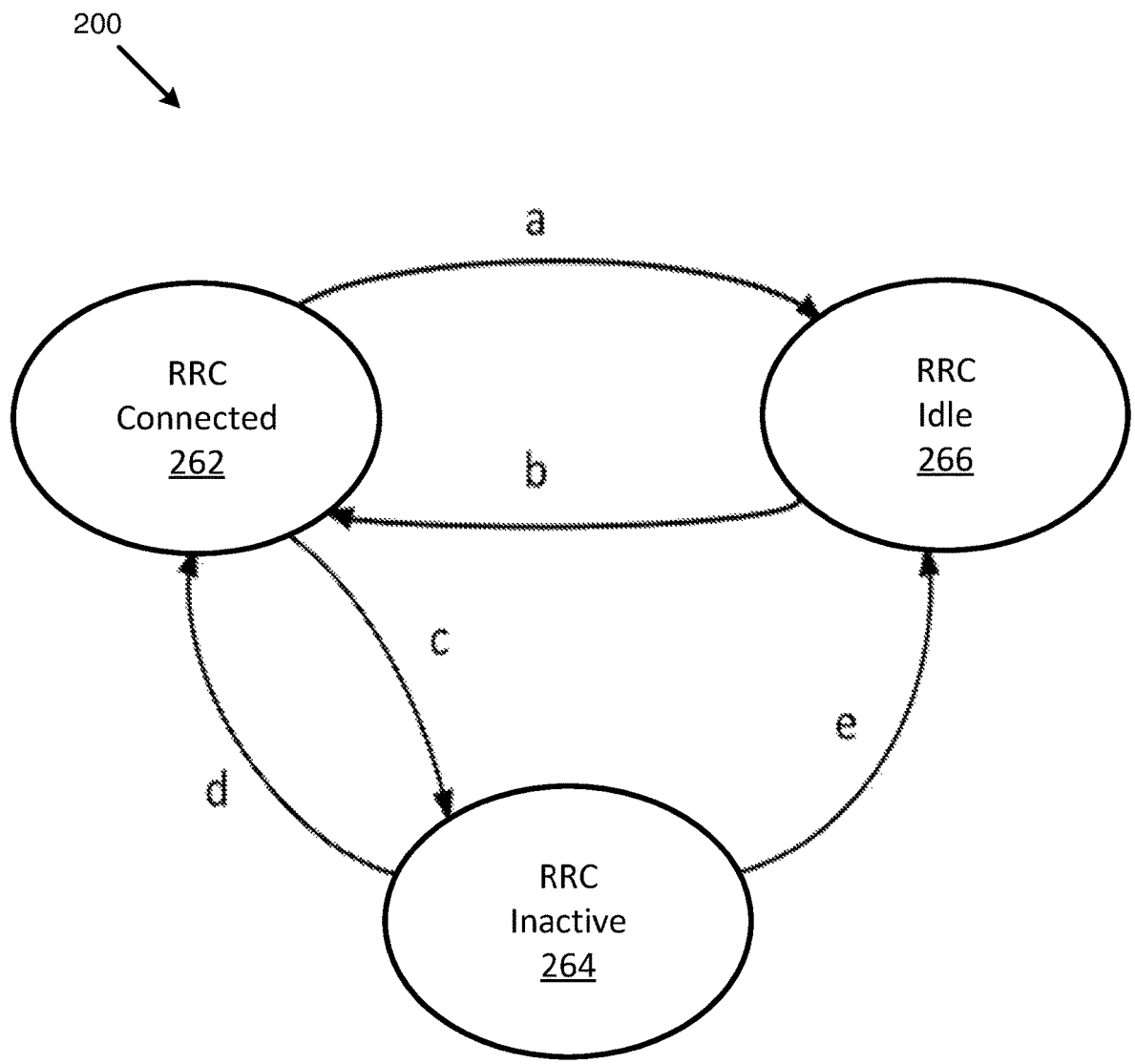
FIG. 2 is an RRC state transition diagram illustrating various RRC state transition procedures that a UE may undergo within an LTE or a 5G NR access network, according to an exemplary implementation of the present application.

FIG. 2 is an RRC state transition diagram illustrating various RRC state transition procedures that a UE may undergo within a next generation radio access network, according to an exemplary implementation of the present application. The RRC state transition diagram 200 may include an RRC Connected state 262, an RRC inactive state 264, and an RRC idle state 266. In the present implementation, the RRC Connected state 262, RRC inactive state 264, and RRC idle state 266 are three RRC states independent of one another. As shown in FIG. 2, a UE may transition among the RRC Connected state 262, RRC inactive state 264, and RRC idle state 266 through various procedures (e.g., procedures a, b, c, d, and e).

For example, a UE may transition to the RRC inactive state 264 from the RRC Connected state 262, or the RRC idle state 266, and vice versa. It should be noted that in the RRC state transition diagram 200, a UE may not transition directly from the RRC idle state 266 to the RRC inactive state 264. That is, a UE may transition to the RRC inactive state 264 from an RRC idle state 266 through an RRC Connected state 262. In one implementation, a UE may transition from the RRC Connected state 262 to the RRC inactive state 264 using an RRC Suspend procedure (e.g., procedure c). Conversely, the UE may transition from the RRC inactive state 264 to the RRC Connected state 262 using an RRC Resume procedure (e.g., procedure d).

I. Dedicated Sidelink Radio Resource Allocation

Figure 3:
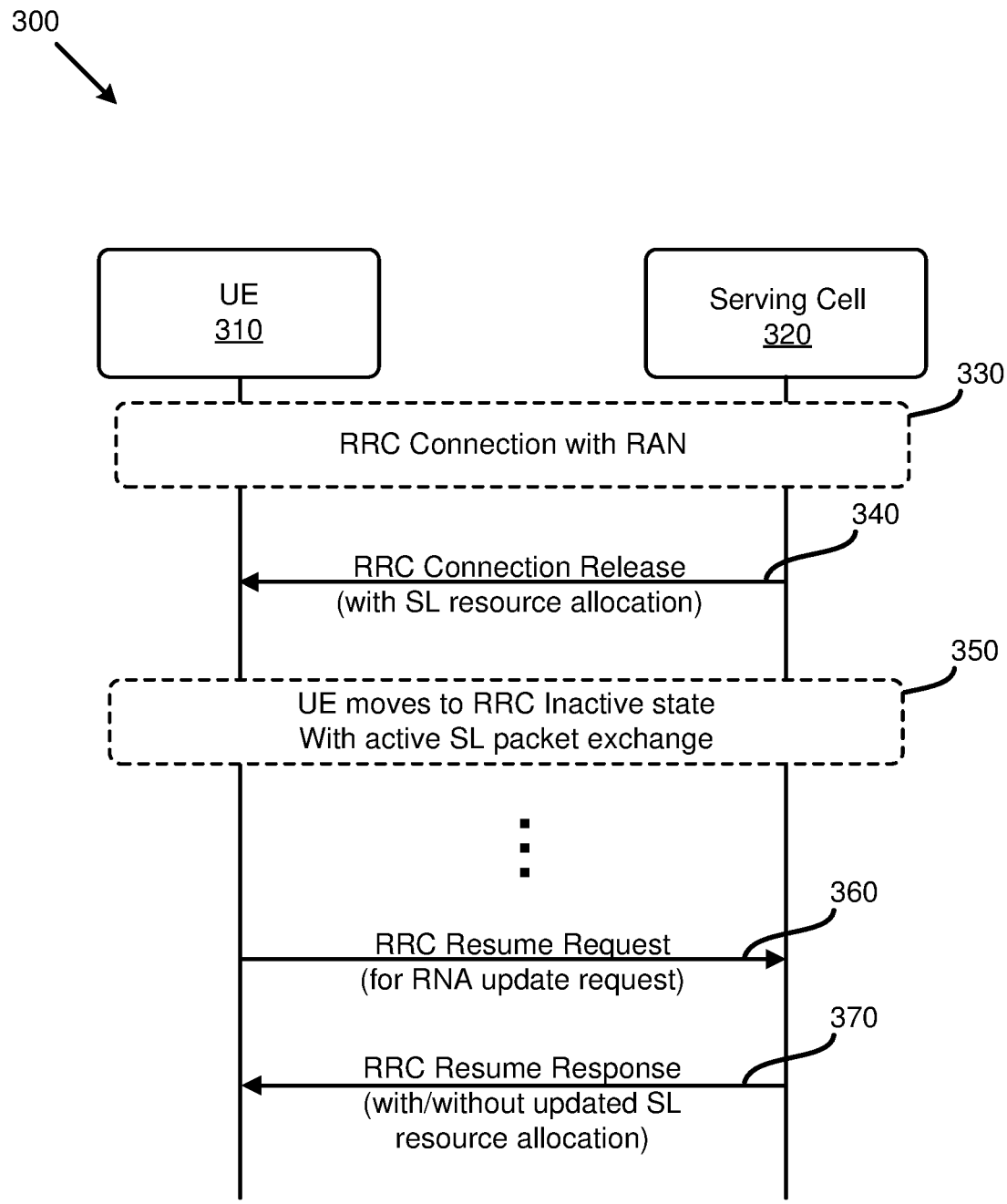
FIG. 3 is a diagram illustrating dedicated sidelink radio resource allocation through RRC signaling, according to an example implementation of the present application.

FIG. 3 is a diagram 300 illustrating dedicated sidelink radio resource allocation through RRC signaling, according to an example implementation of the present application. As shown in FIG. 3, in action 330, a UE 310 is in connection with (or has camped on) a serving cell 320 (e.g., operated by a gNB in NR RAN). The UE 310, at this stage, has an RRC Connected status. In action 340, the serving cell 320 may instruct the UE 310 to move to an RRC Inactive state by sending an RRC Connection Release message (e.g., RRC Connection Release message with an Information Element (IE) 'suspendconfiguration') to the UE 310. In some of the present implementations, the cell 320 (or the base station operating the cell 320) may provide SL radio resource allocation configuration to the UE 310 via the RRC Connection Release message sent in action 340. In one aspect of the present implementations, the base station may provide the configuration, for example, through the information element suspendconfiguration included in the RRC Connection Release message.

Action 350 illustrates that after receiving the SL resource allocation configuration in action 340, the UE 310 may keep transmitting/receiving SL packets to/from other UEs (e.g., the neighboring UEs) through the given SL resources specified in the SL resource allocation configuration, while the UE is in the RRC Inactive state. In action 360, the UE 310 may send an RRC Resume Request message to the serving cell 320 (e.g., to reconnect to the cell 320) and in the message, the UE may request for updated RAN Notification Area (RNA) configuration (e.g., updated SL resource allocation). It should be noted that even though FIG. 3 shows that, in action 360, the UE 310 is sending the RRC Resume Request message to the same cell 320, the UE 310 may send the RRC Resume Request message to another cell different than the cell 320 (e.g., operated by the same or different base station).

As discussed in more detail below, after receiving the RRC Resume Request message, the serving cell 320 may provide updated SL resource allocation configuration (if available) by sending, in action 370, an RRC Resume Response message to the UE 310. In some aspects of the present implementations, the serving cell 320 may instruct the UE 310 to move to an RRC Connected state first. While in the connected state, the UE 310 may provide more SL traffic-related information (e.g., SL traffic type, SL packet size, SL packet arrival pattern, etc.) to the serving cell 320. As such, the serving cell 320 may then be able to provide updated SL resource allocation configuration to the UE 310 based on the received SL traffic information (also referred to as SL assistance information).

As discussed above, in some of the present implementations, after receiving the RRC Connection Resume Request message, in action 360, from the UE 310, the serving cell 320 may respond, in action 370, by sending an RRC Connection Resume Response message to the UE 310. The serving cell 320, however, may provide different types of RRC Connection Resume Response messages to the UE 310.

For example, in one aspect of the present implementations, the serving cell may send the RRC Connection Resume message to the UE to instruct the UE to move to an RRC Connected state directly with all (or part) of the stored UE context. In some of the present implementations, the serving cell may also configure the SL resource allocation (e.g., configured grant configuration and/or resource pool configuration, as described below) to the UE. The UE may apply the SL resource allocation included in the RRC Connection Resume message after the UE transitions to the RRC Connected state. In some of the present implementations, a delta-signaling approach (e.g., by providing SL-ConfiguredGrantToaddList/SL-ConfiguredToRemoveList or SL-PoolToaddList/SL-PoolToRemoveList in signaling to add new SL resource allocation configuration or to remove stored SL resource allocation configuration, respectively)

may be applied to update the SL resource allocation, as will be described in more detail below.

In another aspect of the present implementations, the serving cell may send an RRC Connection Release message with a suspendconfiguration IE (e.g., set to '1' or TRUE) to instruct the UE to stay in the RRC Inactive state after receiving the RRC Connection Release message. In some of the present implementations, the serving cell may provide the SL resource allocation configuration (e.g., configured grant configuration and/or resource pool configuration) to the UE in the RRC Connection Release message. Therefore, the UE may exchange SL packets (with other UEs) based on the SL resource allocations in the RRC Connection Release message. It should be noted that delta-signaling may also be applied in this scenario.

In another aspect of the present implementations, the serving cell may send an RRC Connection Release message without the suspendconfiguration (or with suspendconfiguration IE set to '0' or FALSE) to the UE as the RRC Connection Resume Response message. In some of the present implementations, the UE may release the stored UE context (e.g., UE Inactive context), which may include the stored SL resource allocations, after receiving the RRC Connection Release message (without the suspendconfiguration). Additionally, the UE may move to an RRC Idle state after receiving the RRC Connection Release message. As such, the UE may only apply the SL resource allocation that is broadcast in the System Information (SI). In other words, in some of such implementations, if the serving cell does not broadcast the SL resource allocation in the system information, the UE may not be able to perform SL packet exchange (e.g., due to lack of SL radio resource allocation) or the UE may perform SL packet exchange based on a pre-configuration provided by the upper layers (e.g., the Non-Access-Stratum layer or Layer 3), or through dedicated signaling (e.g., an RRCConnectionReconfiguration message) delivered by the serving cell previously. It should be noted that the sidelink resource configuration may also be provided in the RRC Connection Release message, for example, to instruct the UE to move to an RRC Idle state. As such, the UE may not need to request the SI (e.g., through an SI on-demand procedure) and the validity control of the sidelink resource configuration provided by the RRC Connection Release message may also follow one or more of the rules described below (e.g., in section II. SIDELINK RESOURCE VALIDITY CONTROL). In some of the present implementations, the serving cell may broadcast V2X SI only after receiving a request from the UE.

In yet another aspect of the present implementations, the serving cell may send an RRC Connection Setup message to the UE as the RRC Connection Resume Response message. In some of the present implementations, the UE may move to an RRC connected state and then release the stored UE context, and also stored SL resource allocations, after receiving the RRC Connection Setup message. In some of the present implementations, new SL resource allocations may be configured to the UE with the RRC Connection Setup message. As such, the UE may apply the new SL resource allocation immediately after receiving the RRC Connection Setup message. In some of the present implementations, the new SL resource allocation may not be configured with the RRC Connection Setup message. As such, the UE may apply the SL resource allocation broadcast in the SI. In some of the present implementations, the serving cell may instruct the UE to apply the SL resource allocation in the SI through the RRC Connection Setup message. If the serving cell does not broadcast the SL resource allocation in the SI, the UE may not be able to perform SL packet exchange due to lack of SL radio resource allocation or the UE may perform SL packet exchange based on a pre-configuration provided by the upper layers (e.g., the Non-Access-Stratum layer or Layer 3), or through stored configuration previously delivered by the serving cell (e.g., through an RRCConnectionReconfiguration message). In some of the present implementations, the serving cell does not provide the SL resource allocation in the RRC Connection Setup message, but may provide the SL resource allocation in the RRC Connection Reconfiguration message at a later stage. In some of such implementations, the UE may apply Exceptional SL resource pools (which is described in detail below), that are already stored in the SL resource allocation of the UE context, during the reception of the RRC Connection Setup message and/or the RRC Connection Reconfiguration message.

In another aspect of the present implementations, the serving cell may send an RRC Connection Reject message to the UE to reject the RRC Connection Resume Request received from the UE. After receiving the RRC Connection Reject message, the UE may start counting down a timer and stay in the RRC Inactive state while the timer has not expired. After receiving the RRC Connection Reject message, in some of the present implementations, the UE may apply (i) the SL resource allocation broadcast in the SI, or (ii) the Exceptional SL resource pools, which are preconfigured and stored in the UE as SL resource allocation, until the UE reobtains the SL resource(s) from RAN successfully (e.g., through dedicated control signaling, such as an RRC Connection Reconfiguration message).

A. Sidelink Configured Grant (SL-CG) Configuration

Figure 4:
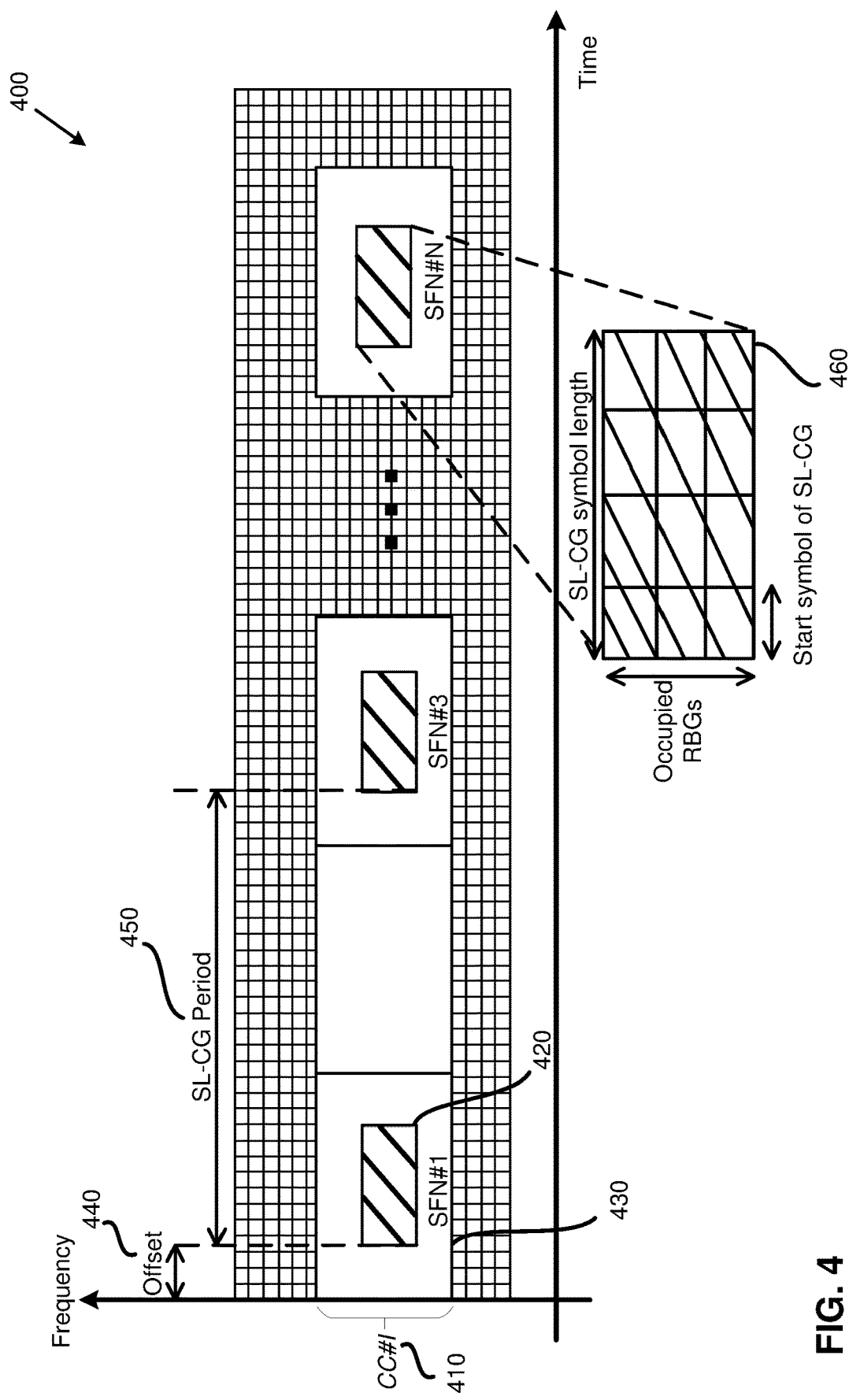
FIG. 4 is a time-frequency resource grid illustrating sidelink configured grant resource allocation configuration transmitted in a component carrier, according to an example implementation of the present application.

In some of the present implementations, a serving cell (or the base station operating the serving cell) may configure the configured grant resource allocation (also referred to as Semi-Persistent-Scheduling (SPS), or mode 1) to the UE for SL packet transmission via the RRC Connection Release message. FIG. 4 is a time-frequency resource grid 400 illustrating sidelink configured grant resource allocation configuration transmitted in a component carrier, according to an example implementation of the present application.

As shown in FIG. 4, a base station may provide, in one component carrier 410, a set of (virtual) Resource Blocks (RBs) called sidelink configured grants (SL-CGs) 420. The SL-CGs 420 may appear periodically (e.g., in the time domain) after the UE receives the dedicated RRC signaling. In some aspects of the present implementations, one SL-CG 420 may include a configuration having several different parameters, such as an SL-CG_index, an SL-CG_Starting_SFN, an SL-CG Period, an SL-CG_offset, an SL-CG_timeDomainAllocation, an SL-CG_start_symbol_index, an SL-CG_symbol_length, and an CG_frequencyDomainAllocation.

In some of the present implementations, the serving cell may configure multiple SL-CG configurations to one UE, and each SL-CG configuration may be configured with an SL-CG_index. The index for a starting system frame number (SFN) 430 of the SL-CG 420 (e.g., after the UE receives the SL-CG configuration from the serving cell), in some of the present implementations, is indicated by the SL-CG_Starting_SFN parameter. The SL-CG_Period parameter may indicate the periodicity of the SL-CG in time domain, wherein the unit of SL-CG_Period may be radio frame, subframe, slot, symbol, or microsecond, millisecond. For example, a SL-CG_Period 450 in FIG. 4 indicates the time interval between the SL-CGs 420. The SL-CG_offset may indicate the offset from the starting point of the SL-CG, for example, with respect to the starting point of the starting SFN 430, in the time domain. In the illustrated example of FIG. 4, a SL-CG Offset 440 indicates the offset for the SL-CGs 420. In some of the present implementations, the unit of the SL-CG_offset parameter may be radio frame, subframe, slot, symbol, millisecond, or microsecond.

The SL-CG_timeDomainAllocation IE (or parameter) may include a combination of the start symbol and the length of the SL-CG in the time domain. The SL-CG_start_symbol_index may indicate the index for the first symbol in the time domain, while the SL-CG_symbol_length may indicate the number of occupied symbols in the time domain. The SL-CG_frequencyDomainAllocation, in some of the present implementations, may include a bitmap for indicating one or more occupied Resource Block Groups (RBGs) the SL-CG occupies in the frequency domain. Each bit in the bitmap may be mapped to a corresponding RBG and the serving cell may indicate '1' (or TRUE) in the bit if the corresponding RBG is configured to the UE for SL packet transmission, otherwise, the bit may be set to '0' (or FALSE).

A SL-CG 460 in FIG. 4 shows more detail in an example SL-CG (e.g., the number of symbols, symbol length, occupied RBGs, etc.). In some aspects of the present implementations, after the UE (e.g., the UE 310 shown in FIG. 3) receives the SL-CG configuration (e.g., through an RRC Connection Release message) from the serving cell (e.g., the serving cell 320 shown in FIG. 3), the UE may exchange SL packets on one or more SL-CGs 420, while the UE is in an RRC Inactive state. In some of the present implementations, several different SL-CG configurations may be provided in one bandwidth part (BWP). In some of such implementations, the serving cell (or the base station operating the serving cell) may activate (and/or deactivate or release) one or more of the provided SL-CG configurations, for example, through RRC signaling or downlink control information (DCI).

B. Sidelink Resource Pool (SL-Pool) Configuration

In some of the present implementations, a serving cell (or the base station operating the cell) may configure SL resource pool (mode 2) to the UE, for example, through an RRC Connection Release message. Similar to the SL-CG configuration, the serving cell may also provide several different IEs (or parameters), such as an SL-Pool_index, an SL_Pool-Starting_SFN, an SL-Pool_Period, an SL-Pool_offset, an SL-Pool_timeDomainAllocation, an SL-PoolfrequencyDomainAllocation, etc., in a single SL-Pool configuration to the UE. After receiving the SL-Pool configuration, the UE may transmit/receive SL packets on one or more SL resource pools, while the UE is in an RRC Inactive state.

The SL resource pools, however, are shared by many other SL UEs, and the UE may only need a subset of the SL resource pools for SL packet exchange. Additionally, the UE may adjust its own transmission parameters (e.g., allowed modulation and coding scheme(s), allowed retransmission numbers, maximum transmission power, maximum/minimum number of sub-channels which may be used for transmission on the PSSCH, etc.) on each SL resource pool based on the UE's channel busy ratio measurement results. Furthermore, the UE may also implement sidelink operation carrier reselections based on the Channel Busy Ratio (CBR) measurement results on the SL-Pool(s), among each sidelink frequency carrier. In some of the present implementations, therefore, the UE may calculate the CBR of one SL resource pool/component carrier/sub-channel by calculating ratio of occupied physical resource blocks (PRBs) (e.g., by measuring Sidelink Received Signal Strength Indicator (S-RSSI)), among the total PRBs in the observed SL-Pool(s), or a subset of the SL-Pool(s) on one carrier, within a period of time.

It should also be noted that, similar to SL-CG configuration, multiple SL-Pool configurations may be provided to one UE (e.g., the configurations being covered by one SL-commTxPoolListV2X) in some of the present implementations. Moreover, each SL-Pool, in some of the present implementations, as will be described in more detail below, may be configured based on one or more zone-based SL resource pools configuration. In some aspects of the present implementations, each SL-Pool may be provided along with (at least) a corresponding zone ID, so that the UE may be able to change the UE's operating SL-Pool(s) based on the UE's mobility.

C. Inter-Carrier SL Resource Allocation

In some of the present implementations, a serving cell may configure an SL-CG configuration, or an SL-Pool configuration, of other frequency carriers (e.g., from a component carrier that is different from the one associated with the serving cell, which is also known as a non-primary cell) for SL packet exchange (e.g., during an RRC Inactive state of the UE). In some of such implementations, each SL-CG configuration (or SL-Pool configuration) may additionally include the component carrier information of the corresponding frequency carrier (e.g., an E-UTRA Absolute Radio Frequency Channel Number (EARFCN) value or an NR-ARFCN value). In some aspects of the present implementations, other parameters, such as the Scellidentity, or Servingcellidentity, may be provided in the SL-CG/SL-Pool configuration when the corresponding frequency carrier is operated by a Pcell, a PScell or the Scell(s) of the UE. Therefore, in some of the present implementations, a UE may be allowed to exchange SL packets (with other UEs) on one, or more than one, component carriers based on the given SL-CG, or the selected SL-Pool, resource allocation configuration, and the corresponding component carrier information.

D. SL-BWP-Based SL Resource Allocation

In some of the present implementations, one or more SL-Pool configurations and/or SL-CG configurations may be configured in one or more than one Sidelink BWPs (SL-BWPs) when the UE is in an RRC Connected state. Additionally, in some aspects of the present implementations, multiple SL-BWPs may be configured to one UE, where each SL-BWP may be configured (to the UE) with one SL-BWP-index. In some of such implementations, the serving cell may indicate the SL-BWP index(ices) to the UE in an RRC Connection Release message, for example, while the serving cell is instructing the UE to move to an RRC Inactive state. As such, the UE may keep applying the given SL resource allocation on the corresponding SL-BWP(s), while the UE is in the RRC Inactive state.

In some of the present implementations, the serving cell may further indicate to the UE which SL-CG/SL-Pool resource configuration(s) in the configured SL-BWP(s) may be applied by the UE, for example, via further indicating the SL-CG index(ices), or SL-Pool index(ices), in an RRC Connection Release message. In one aspect of the present implementations, the SL resource allocation may be configured to the UE only in the initial (or default) SL-BWP of the UE. In some other aspects of the present implementations, the SL resource allocation may be configured to the UE in one or more SL-BWPs in addition to, or instead of, the initial (or default) BWP.

In some of the present implementations, the initial BWP/default BWP configured for NR Uu interface may also be the default operational SL-BWP after the UE moves to an RRC Inactive state. Therefore, the RAN may not further indicate the BWP index (of the initial/default BWP) in the RRC Connection Release message. In some of such implementations, the UE may apply the SL resource allocation on the initial/default BWP autonomously after the UE moves to the RRC Inactive state. In some of the present implementations, the serving cell may indicate to the UE, beforehand, the operational BWP with its corresponding SL resource allocation in an RRC Inactive state (e.g., through the RRCConnectionReconfiguration message). This way, the serving cell may not need to further configure SL-BWP configuration or indicate the SL-BWP index in the RRC Connection Release message.

II. Sidelink Resource Validity Control

After a UE receives sidelink resource allocation configuration, the configured SL resource allocation may need to be updated, especially when the RRC Inactive UE moves from one location to another. Moreover, the network needs to control the validity of the configured SL radio resources stored at the UE. Some of the present implementations provide a zone-based SL resource pools configuration from which the UE may autonomously select resources and check the validity of the selected resources.

Figure 5:
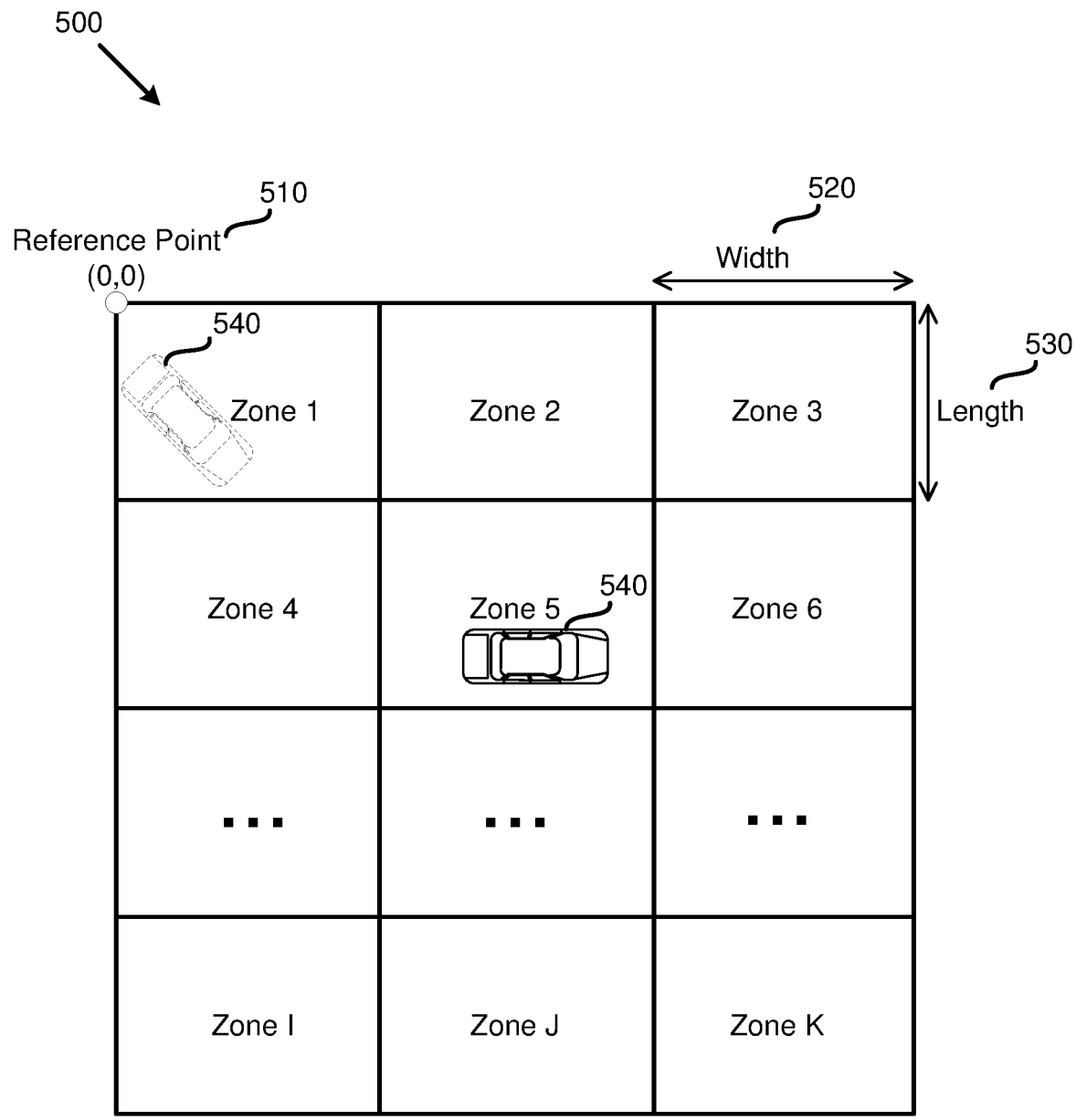
FIG. 5 is a map of a geographical area divided into several different zones, for example, by a base station, according to an implementation of the present application.

FIG. 5 is a map of a geographical area divided into several different zones, for example, by a base station, according to an implementation of the present application. As shown in FIG. 5, a geographical area 500 is divided into logical zones Zone 1, Zone 2, . . . , Zone K by the base station (e.g., a gNB). Each zone may be configured with a unique zone identity (ID) in some aspects of the present implementation. A fixed reference point 510 (e.g., having geographical coordinates (0, 0)), a length 520, and a width 530 of one zone may be provided in the zone configuration in some implementations. A UE (e.g., a vehicle 540) may determine the zone identities by means of modulo operation using the length and width of each zone, number of zones in length, number of zones in width, the single fixed reference point and the geographical coordinates of the UE's current location.

In some of the present implementations, the length and width of each zone, number of zones in length, and number of zones in width may be provided by the base station when the UE is within the coverage area, and may be preconfigured when the UE is out of the coverage area. For the in-coverage UEs, when a UE performs autonomous resource selection, the base station may provide the mapping between the zone(s) and the V2X sidelink transmission resource pools in the broadcasting signaling (e.g., via the system information) in RRC signaling (e.g. for the SL configuration in neighbouring frequency(ies)). For out-of-coverage UEs, the mapping between the zone(s) and the V2X sidelink transmission resource pools may be preconfigured, e.g., by the base station or by the configuration stored in memory module or USIM (UMTS Subscriber Identity Module) of the UE.

In some of the present implementations, as described below in more detail, based on a given zone configuration (or based on a configured zone), the serving cell may configure one or more than one Zone ID(s) in the RNA configuration. As such, the UE may perform an RNA update based on the zone ID(s) observed by the UE, based on the UE's location. In some of the present implementations, the UE may identify whether it is located within the configured RNA, based on the information provided by the GNSS and/or the GPS of the UE.

A. Area-Based Validity Control

As shown in FIG. 3, a UE may need to update the RNA while the UE is in an RRC Inactive state (e.g., in action 360 with reference to FIG. 3). In some of the present implementations, the network (e.g., RAN) may configure different identification parameters, such as the cell list, the RNA code list, the tracking area list, etc., as the range of the RNA to the UE. In some of the present implementations, the UE may need to receive updated RNA while the UE is camping on a cell that belongs to the configured RNA. As such, in some of the present implementations, the network (RAN) may define the RNA based on the SL resource allocation status in the geographical areas. The UE, in some of present implementations, may then transmit/receive the SL packets in the configured RNA without causing interference problem to the neighboring UEs (or base stations).

In some aspects of the present embodiments, based on the configured RNA, the configured SL radio resources (e.g., SL-CG resources or SL-Pool resources) may be valid only in the configured RNA. That is, a UE may not be allowed to apply the configured SL resources if the UE moves out of the stored (configured) RNA. In one aspect of the present implementations, a UE may need to perform an RNA update with the network when the UE moves from one location to another. Conversely, in some of the present implementations, the network may also update the SL resource configuration when the network modifies the RNA configuration.

In some of the present implementations, if a UE has a valid SL resource allocation in one configured area, which may include one or more cells, the UE may not need to request for SL resource allocation in the configured area, even if the camped cell does not broadcast the system information about the V2X services. Similarly, such a UE may not need to request for SL resource allocation in the configured area, even if the camped cell does broadcast the system information about the V2X services, but the SL resource allocation is absent in the associated system information. In such scenarios, the UE may still apply the valid SL resource allocation on the camped cell.

Figure 6:
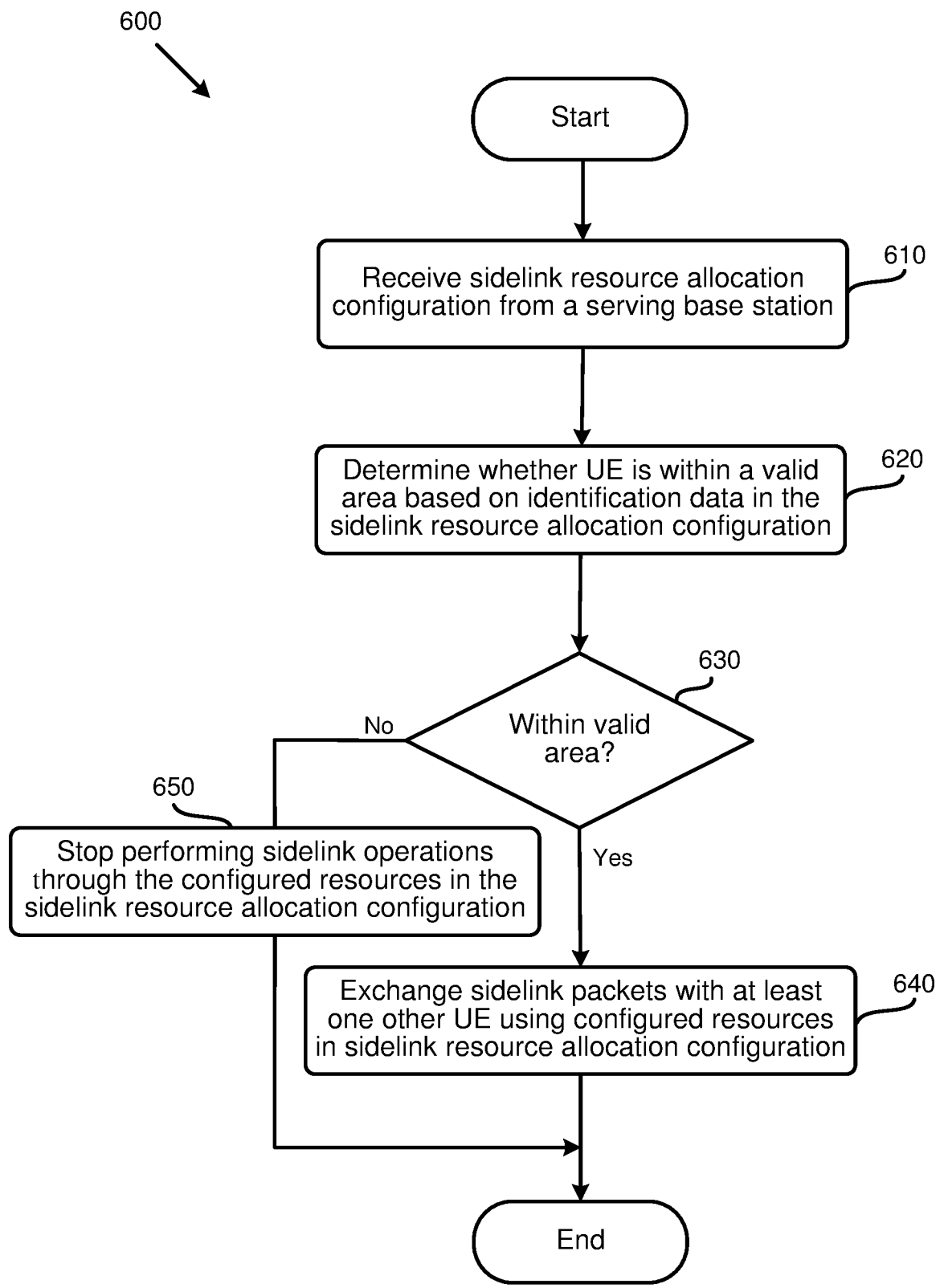
FIG. 6 is a flowchart illustrating a method (or process) performed by a UE to exchange sidelink data with one or more other UEs based on sidelink resource allocation configuration received from a base station, according to an example implementation of the present application.

FIG. 6 is a flowchart illustrating a method (or process) 600 performed by a UE to exchange sidelink data with one or more other UEs based on sidelink resource allocation configuration received from a base station, according to an example implementation of the present application. The process 600, in some of the present implementations, may start in action 610 by receiving, at a UE, SL resource allocation configuration from a base station (e.g., from one or more serving cells of the base station). As discussed above and below, the SL resource allocation configuration may be received through an RRC Connection Reconfiguration message, an RRC Connection Resume Response message (e.g., during an RRC Connection Resume procedure), an RRC Release message to transition from an RRC Connected state to an RRC Inactive state, or via the broadcasting system information.

In some of the present implementations, after the UE is configured with the SL resource allocation configuration, the process 600 may determine, in action 620 whether the UE is within a valid area (e.g., the RNA), e.g., when the UE moves from a first location to a second different location (e.g., from Zone 1 to Zone 5, as shown in FIG. 5). The process 600 of some of the present implementations may make such a determination based on the area/zone identification data that is included in the SL resource allocation configuration. In some of the present implementations, the process 600 may make such determination when the process determines that the UE has moved for more than a threshold (e.g., predefined) distance from its original location.

In some of the present implementations, the area/zone identification data that is included in the SL resource allocation configuration may include, but is not limited to, one, or a combination, of one or more cell identities (e.g., the CellIdentity, which is broadcast by a cell in its SIB1 to unambiguously identify a cell within a Public Land Mobile Network (PLMN)), one or more RAN-Area codes, one or more tracking area codes, one or more system information area identifiers, etc. When the process 600 determines, in action 630, that the UE is within a valid area (e.g., within the RNA), the process may, in action 640, start, or continue, exchanging sidelink packets with one or more other UEs based on the SL resources configured to the UE (e.g., SL-CG resources and/or SL-Pool resources) by the serving base station. The process may then end.

It should also be noted that, in some aspects of the present implementations, the SL resource allocation configuration may be only accessible to the UEs registered to one (or more than one) specific PLMN(s), with each PLMN distinguished by one unique PLMN identity. In some of such implementations, the described cell identity, RAN-Area code, tracking area code, and system information area identifier may be further associated with one PLMN identity in the SL resource allocation configuration. As such, the cell identity associated with one PLMN identity may be applied to represent the (unique) cell defined in the associated PLMN; the RAN-Area code associated with one PLMN identity may be applied to represent the (unique) RAN-Area defined in the associated PLMN; the tracking area code associated with one PLMN identity may be applied to represent the (unique) tracking area defined in the associated PLMN; and the system information area identifier associated with one PLMN identity may be applied to represent the (unique) system information area defined in the associated PLMN.

In some additional implementations, the cell may broadcast a PLMN identity list (e.g., plmn-IdentityList) to indicate the PLMN(s) supported by the cell and the described cell identity, RAN-Area code, tracking area code, and system information area identifier may be implicitly associated with the first PLMN identity based on the order of the PLMN identities in the PLMN identity list. Therefore, in the validity control, the UE may further check its registered PLMN(s) with the associated PLMN identities of the cell identity, RAN-Area code, tracking area code, and system information area identifier. For example, a UE may consider one configured valid area (e.g., configured with one associated PLMN identity) may not be applicable when the associated PLMN identity is different from the UE's registered PLMN(s), and/or when the UE's registered PLMN(s) is not the 'equivalent PLMN' of the PLMN indicated by the associated PLMN identity.

When the process 600 determines (e.g., in action 630), however, that the UE is outside the valid area (e.g., outside the RNA), the process may, in action 650, stop performing the sidelink operations (e.g., do not start, or stop, exchanging sidelink packets with the other UEs) through the configured resources in the sidelink resource allocation configuration. The process may then end.

B. Time-Based Validity Control

In some of the present implementations, the network (RAN) may configure a timer (e.g., an RNA Update timer) to the UE. In some of such implementations, the timer may be configured to the UE through the suspendconfiguration, for example. The value of the RNA Update timer may be defined by the base station, or may be preconfigured to the UE. The UE may start counting down the RNA Update timer (e.g., to zero) after the UE moves to an RRC Inactive state in some of the present implementations. When the RNA Update timer reaches zero, the UE may start an RNA Update procedure by sending a request (e.g., an RRC Resume Request as shown in FIG. 3) to the camped cell. After the UE determines that RNA Update procedure is successful, the UE may reset the RNA Update Timer to its initial value (e.g., for the next RNA Update procedure). Therefore, in some of the present implementations, the UE may not be allowed to apply the configured SL radio resources after the RNA Update timer expires (and after the UE determines that an RNA Update procedure with the RAN was not successful).

In some aspects of the present implementations, a UE may receive SL resource allocation configuration from the broadcasting system information, and the valid area associated with the SL resource allocation configuration may cover one (or more) cell identity, RAN-Area code, tracking area code, and system information area identifier. In some of such implementations, the UE may store the SL resource allocation configuration with a counting timer, the initial value of which may be configured by the serving cell that delivers the SL resource allocation configuration (or may be preconfigured in the technical specifications (e.g., 180 minutes)). The UE may start counting down the timer while the UE stores the SL resource allocation configuration. Thereafter, the UE may release (or deactivate) the stored SL resource allocation configuration (even if the UE is still staying in the valid area of the stored SL resource allocation configuration) while the timer is reaching zero. In addition, the UE may try to receive the latest SL resource allocation configuration by monitoring the broadcasting system information (or by performing system information on-demand procedure with the serving cell). In some of the present implementations, the UE may initiate an RRC Connection Establish/Resume procedure with the serving cell after the UE releases the stored SL resource allocation configuration.

C. RAN-Paging Validity Control

Figure 7:
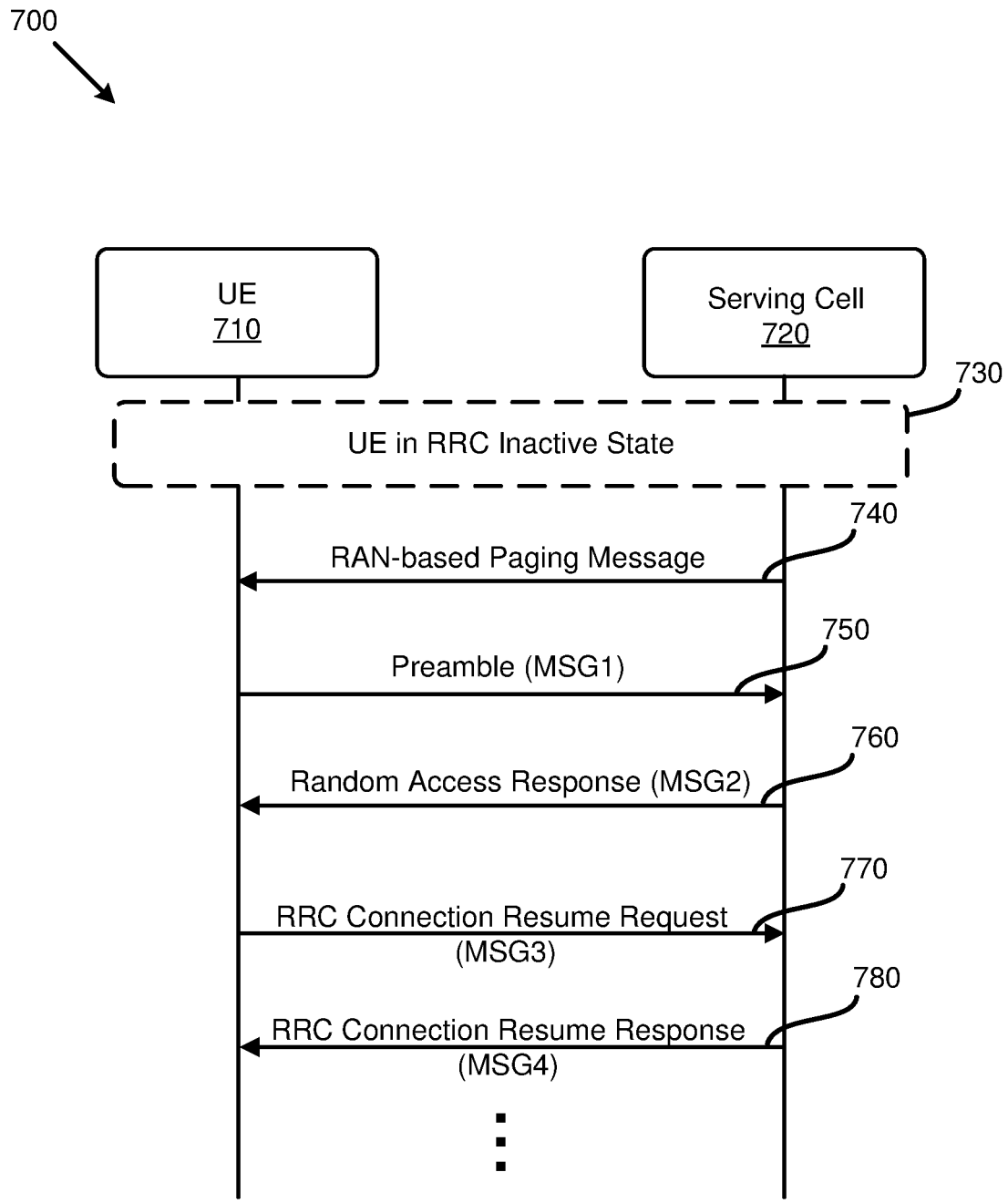
FIG. 7 is a diagram illustrating a RAN-Paging validity control performed by a UE, according to one example implementation of the present application.

FIG. 7 is a diagram 700 illustrating a RAN-Paging validity control performed by a UE, according to one example implementation of the present application. As shown in FIG. 7, in action 730, the connection of a UE 710 with a serving cell 720 (e.g., operated by a serving gNB) is suspended. That is, in action 730, the UE 710 has an RRC Inactive status (or is in an RRC Inactive state). In action 740, the serving cell 720 may instruct (or page) the UE 710 to resume its connection with the serving cell by sending a RAN-based paging message to the UE 710.

After receiving the RAN-based paging message, which may include the UE ID, the UE 710 may not be allowed to apply the configured SL resource allocation any more in some of the present implementations. Instead, the UE 710 may start performing an RRC Connection Resume procedure with the serving cell in order to receive updated SL resources. As such, the UE 710 may send an RA preamble to the serving cell 720 in action 750. After receiving an RA response from the serving cell 720, in action 760, the UE 710 may transmit, in action 770, an RRC Connection Resume Request message to the serving cell, which may include a request for updated SL resource allocation configuration. The serving cell 720 may then provide, in action 780, the updated SL resource allocation configuration to the UE by sending an RRC Connection Resume Response message, which may include the updated configuration. As such, the UE may apply the updated SL resource allocation configuration to the sidelink packet delivery after receiving the RRC Connection Resume Response message successfully. Some aspects of the present implementations may allow the UE to apply Exceptional SL-Pools (as described below, e.g., in section III), while the connection resume procedure is being performed.

D. RAN Instructions (to RRC Connected UE)

In some of the present implementations, the serving cell may indicate that some of the SL-CG configuration and/or SL-Pool configuration is invalid, for example, through dedicated control signaling (e.g. an RRCConnectionReconfiguration message). As such, the UE may not be allowed to apply an invalid SL-CG/SL-Pool if it is invalidated by the RAN. Conversely, in some of the present implementations, the serving cell may revalidate some or all of the invalid SL resource allocations, e.g., through dedicated control signaling as well. In some of the present implementations, both RAN and the UE may still store the invalid SL resource allocations in their UE (inactive) context or memory module, respectively. In some of such implementations, the stored configuration may be forwarded from the source cell to (at least) one target cell during a handover procedure. In addition, the valid/invalid state of SL resource allocations may be kept during the transitions between the RRC Connected state and the RRC Inactive state or between other RRC state transitions.

In some of the present implementations, the UE may apply the SL resources delivered in the system information if the SL resource allocation (configured by dedicated RRC signaling) becomes invalid. In some of the present implementations, the serving cell may provide Exceptional SL-Pools (as discussed in more detail below) for the UE to apply after the SL resource allocation (configured by dedicated signaling) becomes invalid.

In some of the present implementations, an RRC Inactive UE may trigger an RRC Connection Resume procedure even when part, or all, of the stored SL resource allocation is still valid for the UE, when more SL resource allocations are required by the UE. Moreover, in such a scenario, one additional RRC Resume Cause (e.g., SL resource allocation request) may be considered (e.g., in the technical specification). This way, the UE may indicate an SL resource allocation request, e.g., in the RRC Resume Request message, to the serving cell. After receiving the RRC Resume Request message, the serving cell may provide more SL resource allocation in the RRC Resume Response message to the UE.

Figure 8A:
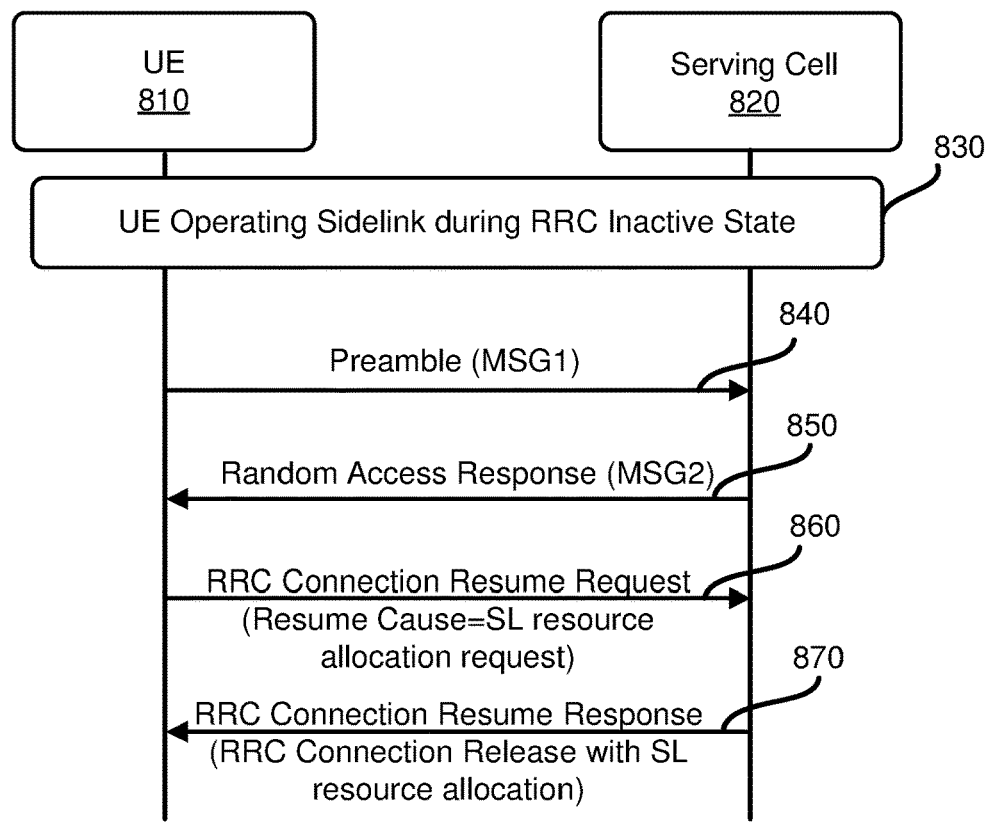
FIGS. 8A and 8B are diagrams illustrating different examples of sidelink resource allocation by a serving cell, according to an example implementation of the present application.

FIG. 8A is a diagram illustrating an example of sidelink resource allocation by a serving cell, according to an example implementation of the present application. As shown in FIG. 8A, in action 830, the connection of a UE 810 with a serving cell 820 (e.g., operated by a serving gNB) is suspended and the UE 810 is performing sidelink operations (e.g., exchanging sidelink packets with other UEs) while the UE is in an RRC Inactive state. In action 840, the UE 810 may start performing an RRC Connection Resume procedure with the serving cell in order to receive additional (and/or updated) SL resource allocations. As such, the UE 810 may send an RA preamble to the serving cell 820 in action 840. After receiving an RA response from the serving cell 820 in action 850, the UE 810 may transmit, in action 860, an RRC Connection Resume Request message to the serving cell 820, which may include Resume Cause (or an SL resource allocation request). The serving cell 820 may then provide, in action 870, additional (and/or updated) SL resource allocations to the UE by sending an RRC Connection Resume Response message that may include the additional SL resource allocations. In one aspect of the present implementations, the RRC Connection Resume Response message may also include, for example, a suspendconfiguration IE to instruct the UE 810 to remain in the RRC Inactive state (or transition to an RRC Idle state) while the UE 810 is using the required (additional) SL resources.

Figure 8B:
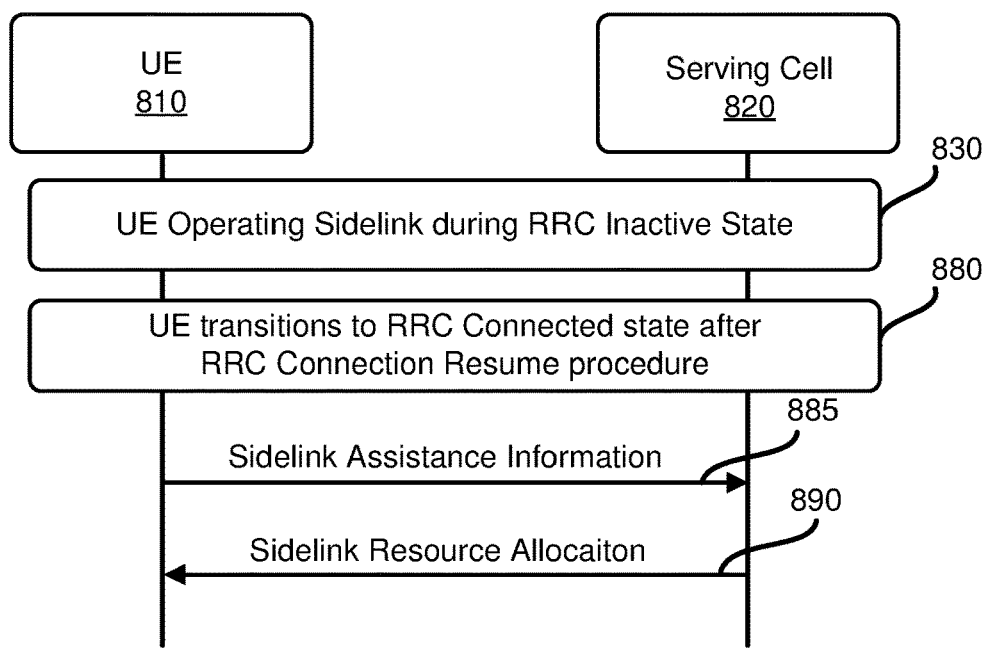

FIG. 8B is a diagram illustrating another example of sidelink resource allocation by a serving cell, according to an example implementation of the present application. In some of the present implementations, the serving cell 820 may instruct the UE 810 to move to an RRC Connected state and then the UE may transmit more SL-traffic-related information (e.g., SL traffic type, SL packet size, SL packet arrival pattern, etc.) to the serving cell (e.g., by transmitting sidelink Assistance Information to the serving cell).

As shown in FIG. 8B, in action 830, similar to FIG. 8A, the connection of the UE 810 with the serving cell 820 (e.g., operated by a serving gNB) is suspended and the UE 810 is performing sidelink operations (e.g., exchanging sidelink packets with other UEs) while the UE is in an RRC Inactive state. Action 880, however, shows that an RRC Connection Resume procedure has been performed successfully and, as a result, the UE transitions to an RRC Connected state. While the UE is active and in the RRC Connected state, the UE 810 may transmit, in action 885, a message to the serving cell 820 that may include SL Assistance Information, as described above. After obtaining the SL-traffic-related information for the active UE 810, the serving cell 820 may provide a new SL resource allocation to the UE 810 by transmitting, in action 890, a message to the UE that may include the SL resource allocation.

In some of the present implementations, a UE may start an RRC Connection Resume procedure if the sidelink control parameters broadcast in the system information (e.g., by the serving cell), or the UE's own preference for a sidelink operation, has changed. In some of such implementations, the UE may send an RRC Connection Resume Request message which may include a Resume Cause (e.g., SL Operation Modification) to the serving cell. The serving cell may then instruct the UE to move to an RRC Connected state to transmit the Sidelink Assistance information (e.g., SidelinkUEInformation) to the serving cell. The serving cell may configure new sidelink control parameters to the UE based on the received Sidelink Assistance information in some of the present implementations.

In some of the present implementations, the UE may trigger an RRC Connection Resume procedure after a sidelink Buffer Status Report is triggered/pending (or after the UE determines that one or more of the pending SL packets are larger than a predefined threshold). In some of such implementations, the UE may send an RRC Connection Resume Request message which may include a Resume Cause (e.g., SL resource allocation request). Additionally, in some of the present implementations, the UE may transmit a Sidelink Buffer Status Report with the RRC Connection Resume Request message. In some other aspects of the present implementations, the SL Buffer Status Report may be transmitted after the UE transitions to an RRC Connected state. In those implementations, the serving cell may provide the SL resource allocation based on the received Sidelink Buffer Status Report. In yet some other aspects of the present implementations, the UE may not be allowed to transmit the sidelink Buffer Status Report while the UE is in the RRC Inactive state. In such implementations, the sidelink Buffer Status Report may be transmitted during an RNA Update procedure, instead.

III. Exceptional SL-Pools

In some scenarios, as discussed below under subsection (a) to (f) (also referred to as Exceptional Conditions), a UE may not be allowed to apply the configured SL radio resources. In some of the present implementations, the network (RAN) may (pre)configure 'Exceptional SL-Pools' to the UEs, e.g., through dedicated RRC signaling (e.g., an RRCConnectionReconfiguration message or an RRCConnectionRelease message). In some of such implementations, the UEs may be allowed to transmit/receive SL packets on Exceptional SL resource pool only when at least one of the Exceptional Conditions has occurred.

In some aspects of the present embodiments, the configuration approach for Exceptional SL-Pools may be similar to the SL-Pool configuration, as discussed above. That is, in some of the present implementations, the network (RAN) may configure the Exceptional SL-Pools to a UE through RRC signaling (e.g., through pre-configuration or SI broadcasting). As such, when a UE determines that an Exceptional Conditions (as discussed below) has occurred, the UE may apply the Exceptional SL-Pools directly (e.g., use the Exceptional SL-Pools resources preconfigured to the UE) to maintain the continuity of the SL communications (e.g., the V2X services).

As mentioned above, in some of the present implementations, the Exceptional SL-Pools may be provided via dedicated RRC signaling (e.g., the RRCConnecctionReconfiguration with/without mobilitycontrolinformation, or reconfigurationWithSync), or through broadcasting (e.g., system information broadcasting or by SI on-demand), or may be preconfigured by the upper layers (e.g., the Non-Access-Stratum layer or Layer 3).

It should be noted that, similar to Section I and II, discussed above, the present implementations discussed with respect to Exceptional SL-Pools may not be limited to UEs that are in the RRC Inactive state. That is, some of the present implementations may equally apply to the UEs that are in the RRC Connected state and/or in the RRC Idle state. In other words, the Exceptional SL-Pool configuration may not be impacted by the RRC state transitions (e.g., from an RRC Inactive state to an RRC Connected state and/or from an RRC inactive state to an RRC Idle state and/or from an RRC Connected state to an RRC Idle state and/or from an RRC Connected state to an RRC Inactive state and/or from an RRC Idle state to an RRC Connected state).

(a) During an RRC Connection Resume Procedure

A UE may not be allowed to apply the configured SL radio resources after the UE starts an RRC Connection Resume procedure with a serving cell (e.g., start to transmit an RA preamble (MSG1) to the serving cell). The RRC Connection Resume procedure may be a 2-step RRC Connection Resume procedure (i.e., contention-free) or a 4-step RRC Connection Resume procedure (i.e., contention-based).

In some of the present implementations, The UE may be allowed to apply the Exceptional SL-Pools during the RRC Connection Resume procedure (e.g., while T319 in NR protocols is counting or after the UE initiates the RRC Connection Resume procedure, and before the UE receives the RRC Connection Resume Response message (an RRCConnectionReconfiguration message), which may include the SL resource allocation for the UE).

(b) Camped on any Cell and/or any Cell Selection

A UE may not be allowed to apply the configured SL radio resources when the UE is moving to a "Camped on any cell" or an "Any cell Selection" state, which may be considered as sub-states of an RRC Inactive state. In some of the present implementations, the UE may reapply the configured SL resources when the UE is moving from the "Camped on any cell" or a "Any cell Selection" state back to a "Camped Normally" state. In some of the present implementations, the configured SL resource allocation becomes invalid automatically after the UE moves to a Camped on any cell/Any cell Selection state. In some of such implementations, the UE may need to connect with the RAN again for requesting SL resource allocation after moving back to the Camped Normally state.

In some aspects of the present implementations, the UE may keep applying the configured SL resource allocation even when the UE moves to a Camped on any cell/Any cell selection state. In addition, after the UE moves to a Camped on any cell/Any cell selection state, the SL resource allocation validity control may be still realized according to some aspects of the present implementations (e.g., as discussed above in subsection B. (Time-Based Validity Control)).

In some of the present implementations, the UE may be allowed to apply Exceptional SL-Pools while the UE is staying in a Camped on any cell/Any Cell selection state. In some of the present implementations, the UE may apply preconfigured SL resource allocation when the UE is moving to a Camped on any cell or Any Cell Selection state. Such a pre-configuration may be provided by the upper layers (e.g., the Non-Access-Stratum layer or Layer 3), or through dedicated signaling (e.g., an RRCConnectionReconfiguration message) delivered by the serving cell. The preconfigured SL resource allocation may include one or more SL-Pools configurations in some of the present implementations.

(c) Radio Link Failure with the Serving Cell

In some of the present implementations, a UE may fall into a radio link failure (RLF) condition. In this condition, the UE may stop applying the configured SL resource allocation. In some of the present implementations, the UE may perform an RRC Connection Re-Establishment to solve the radio link failure problem. In some aspects of the present implementations, however, the UE may be allowed to apply the Exceptional SL-Pool(s) after the radio link failure event is triggered. Table 100 below illustrates start/stop conditions and the UE's behavior after expirations of timers T310/T311/T301/T304. which includes,

TABLE 100

| Timer | Start/Stop condition & UE behavior after timer expiry |
|---|---|
| T310 | Start: when the UE detects a PHY layer problem (e.g., N310 consecutive out-of-sync INDs from lower layers)<br>Stop:<br>1. When UE receives N311 consecutive in-sync INDs from the PHY layer<br>2. Upon triggering a handover procedure<br>3. Upon initiating an RRC Connection Re-Establishment procedure<br>After T310 Expiry:<br>1. if UE's security is not activated yet, then UE goes to RRC Idle state<br>2. otherwise, UE initiates an RRC Connection Re-Establishment procedure |

TABLE 100-continued

| Timer | Start/Stop condition & UE behavior after timer expiry |
|---|---|
| T311 | Start: when the UE initiates an RRC Connection Re-Establishment procedure<br>Stop: when the UE selects a suitable E-UTRA cell or a cell of other RATs<br>After T311 expiry:<br>UE enters an RRC Idle state |
| T301 | Start: When the UE sends an RRC Connection Re-establishment Request<br>Stop:<br>1. When the UE receives an RRC Connection Re-establishment message, or an RRC Connection Re-Establishment Reject message, or<br>2. When the selected cell becomes unsuitable to the UE.<br>After T301 expiry:<br>UE moves to an RRC Idle state |
| T304 | Start:<br>1. when the UE receives an RRC Connection Reconfiguration message along with the Mobility Control Info (or Reconfiguration with a sync message), or<br>2. when the UE receives a CELL_CHANGE_ORDER message<br>Stop:<br>1. when the UE completes a HANDOVER to EUTRA or a CELL_CHANGE_ORDER procedure is successful.<br>After T304 expiry (handover to E-UTRA failure):<br>1. UE resets MAC and then performs the actions defined for this failure case as applicable for the other RATs |

With reference to the table 100 above, a UE may be allowed to apply the Exceptional SL-Pool(s), while the T310 or T311 of the LTE protocols is running in some of the present implementations. Similarly, the UE may be allowed to apply the Exceptional SL-Pool(s), while the T301 of the LTE protocols is running. It should be noted that these two scenarios are also applicable to the UEs that are in the RRC Inactive state.

In some of the present implementations, a UE may be allowed to apply the Exceptional SL-Pool(s), while the T304 of the LTE protocols is running (e.g., for sidelink operations during a handover procedure). This scenario is also applicable to the UEs in the RRC Connected state.

(d) Beam Failure with the RAN

A UE may suffer from beam failure with the RAN (e.g., beam failures with the Pcell or PScell). In some aspects of the present implementations, the beam failure event with the serving cell may not impact the SL packets transmission/reception, however, in some other aspects of the present implementations, the UE may stop applying the configured SL resources when the UE determines that a beam failure with RAN has occurred.

Figure 9:
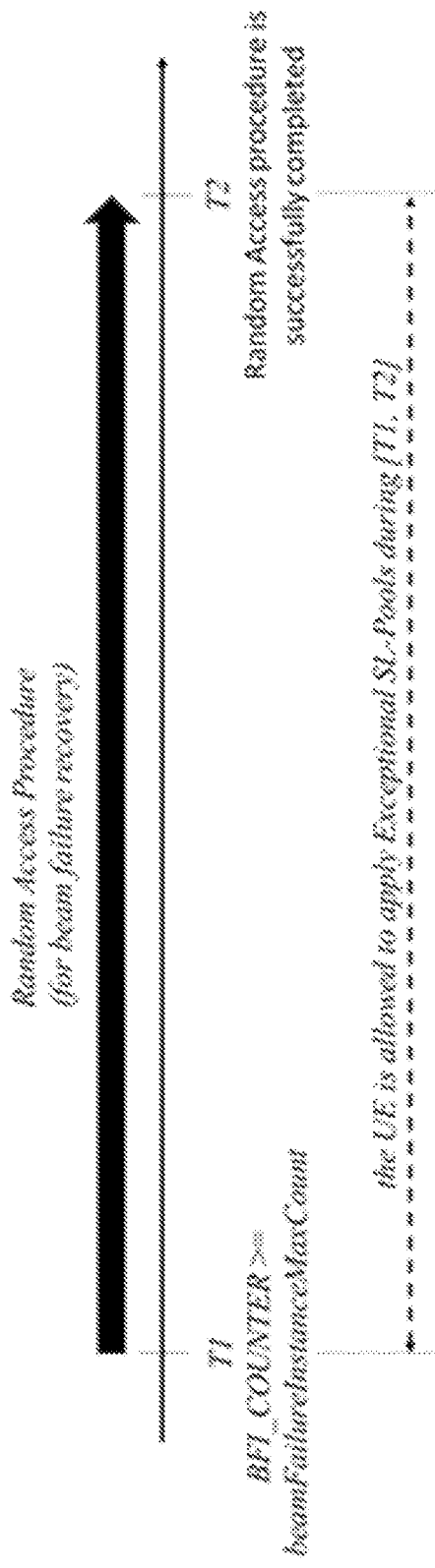
FIG. 9 illustrates an example application of Exceptional SL-Pools during a beam failure recovery procedure, according to one example implementation of the present application.

FIG. 9 illustrates an example application of Exceptional SL-Pools during a beam failure recovery procedure, according to one example implementation of the present application. As shown in FIG. 9, in some aspects of the present implementations, the UE may first initiate a random access procedure on a special cell (e.g., the PCell in a Master Cell Group) when a trigger condition for a beam failure event is fulfilled (e.g., when the BFI_COUNTER, which represents the number of beam failure instance indications that the MAC layer of the UE has collected from the lower layers, reaches the beamFailureInstanceMaxCount before a preconfigured timer (e.g., the beamFailureDetectionTimer) expires). In some of such implementations, the UE may be allowed to apply the Exceptional SL-Pool(s) during the beam failure recovery procedure. In some of the present implementations, the UE may not be allowed to keep applying the (Non-Exceptional) SL-Pool(s) if the random access procedure initiated for beam failure recovery is successfully completed. In addition, in some implementations, the UE may initiate more than one random access procedures, which may include contention-based random access (CBRA) procedure and contention-free random access (CFRA) procedure, for beam failure recovery. In some of such implementations, the UE may be allowed to apply the Exceptional SL-Pool(s) during such random access procedures (e.g., until the beam failure recovery is terminated).

In some of the present implementations, the random access procedure for beam failure recovery may be terminated successfully if the UE receives a Physical Downlink Control Channel (PDCCH) transmission on the search space indicated for beam failure recovery (e.g., by the serving cell) and the PDCCH transmission is scrambled by the Cell-Radio Network Temporary Identifier (C-RNTI) of the UE. In some other aspects of the present implementations, the random access procedure for beam failure recovery may be terminated successfully if the Random Access Response (RAR) contains a MAC subPDU with the Random Access Preamble identifier corresponding to the transmitted preamble.

In some of the present implementations, the UE may be allowed to apply Exceptional SL-Pools while the UE is performing a beam failure recovery with the serving cell. In addition, the UE may continue applying the Exceptional SL-Pools until the UE finishes the beam failure recovery with the serving cell successfully in some of the present implementations. In some aspects of the present implementations, the UE may apply the information provided by a GNSS/GPS synchronization for SL communications.

(e) Stored SL Resource Allocation is Invalid

As discussed above, in some of the present implementations, the stored SL resource allocation may become invalid (e.g., when the UE is out of the configured RNA or the RNA update timer expires). In some of the present implementations, the UE may apply Exceptional SL-Pool(s) after (all of the) stored SL resource allocation become invalid. In addition, the UE may keep applying the Exceptional SL-Pool (e.g., stop SL communication with other UEs) until the UE reobtains the SL resource allocation from the serving cell.

In some of the present implementations, the UE may apply Exceptional SL-Pool(s) after all of the stored SL resource allocations become invalid (e.g., based on the proposed validity control mechanisms described above). The UE, in some of such implementations may apply Exceptional SL-Pool(s) until the UE reobtains the SL resource allocation from the serving cell. In some of the present implementations, the Exceptional SL-Pool may also be a part of the stored SL resource allocation. As such, in some of such implementations, the Exceptional SL-Pool(s) may not be invalidated by the RAN and the stored Exceptional SL-Pool configurations may not be impacted by the RRC state transitions.

(f) UE Requests System Information for SL Resource Allocation

Figure 10A:
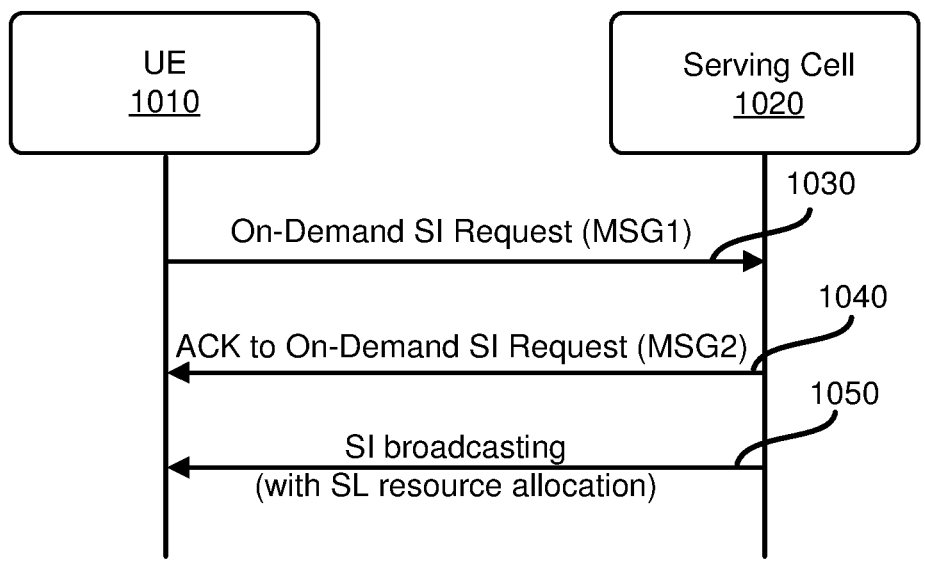
FIGS. 10A and 10B are diagrams illustrating, respectively, a UE applying a two-step random access procedure and a four-step random access procedure to request system information, according to an example implementation of the present application.
Figure 10B:
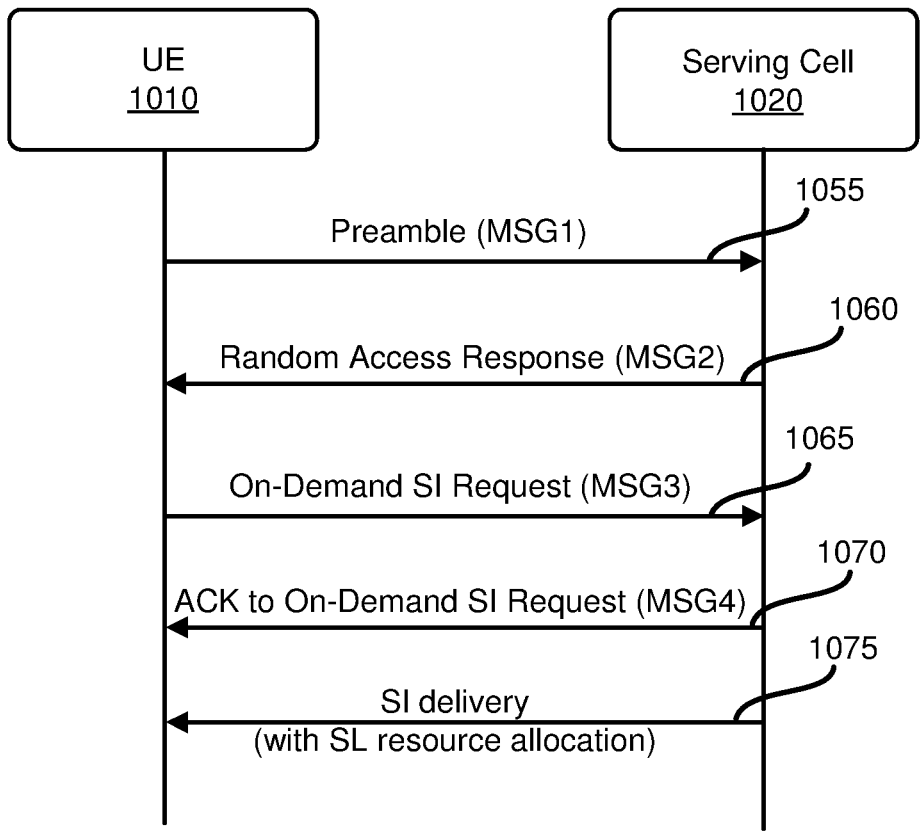

In NR, a serving cell may broadcast SL resource allocation via on-demand system information broadcasting. FIGS. 10A and 10B are diagrams illustrating, respective, a UE applying a two-step random access procedure and a four-step random access procedure to request system information, according to an example implementation of the present application. FIG. 10A shows a UE 1010 sending, in action 1030, an on-demand SI request (MSG1) to a serving cell 1020. In action 1040, the serving cell 1020 may send an acknowledge to the on-demand SI request (MSG2) back to the UE 1010. After sending the acknowledgment, the serving cell 1020 may transmit, in action 1050, the SL resource allocations to the UE 1010, for example, through SI broadcasting.

FIG. 10B, which is requesting SI through a 4-step random access procedure, shows the UE 1010 sending, in action 1055, an RA preamble (MSG1) to the serving cell 1020. In action 1060, the serving cell 1020 may send an RA response (MSG2) to the UE 1010. The UE 1010 may then send, in action 1065, an on-demand SI request (MSG3) to the serving cell 1020. In action 1070, the serving cell 1020 may send an acknowledge to the on-demand SI request (MSG4) back to the UE 1010. After sending the acknowledgment, the serving cell 1020 may transmit the SL resource allocations to the UE 1010, in action 1075, through SI broadcasting. When a UE has no SL resource allocations for SL packet exchange, in some of the present implementations, the UE may apply Exceptional SL-Pool(s) only before the UE obtaining the SL resources from a system information broadcasting message.

In some of the present implementations, the SL resource allocation may be part of the UE context. The UE, however, may keep the stored SL resource allocation even when the UE is moving from an RRC Inactive state to an RRC Connected state, or vice versa. The RAN may also keep the configured SL resource allocation while the UE is staying in the RRC Inactive and/or RRC Connected state in some of the present implementations. In addition, some of the present implementations, the serving cell may apply delta signaling to update the SL resource allocation of the UE.

For example, the serving cell may configure the SL-CGToaddList and SL-CGToRemoveList parameters to the UE. The SL-CGToaddList parameter may provide a new SL-CG configuration to the UE. The SL-CGToRemoveList parameter may include at least one SL-CG index when the serving cell wants to remove the corresponding SL-CG configuration(s) from the stored SL-CG configuration. In some of the present implementations, the serving cell may also configure the SL-PoolToaddList and SL-PoolToRemoveList parameters to the UE. In some of the present implementations, the SL-PoolToaddList parameter may provide a new SL-Pool configuration to the UE. The SL-PoolToRemoveList parameter may include at least one SL-Pool index when the serving cell wants to remove the corresponding SL-CG configuration(s) from the stored SL-CG configuration.

In some of the present implementations, the SL resource allocation may optionally be present in the RRC Connection Resume Response message. If the SL resource allocation is absent, in some of the present implementations, the UE may keep the stored SL resource allocation. By contrast, the SL resource allocation may be present in the RRC Connection Resume Response message, while the UE may fully replace the stored SL resource allocation (e.g., via updated SL resource allocation). In some of the present implementations, if the SL resource allocation is absent, the UE may release the current value. In such a scenario, the UE may apply the SL resource allocation broadcast by system information automatically when the SL-Pool configuration is provided through the system information. Otherwise, the UE may not perform sidelink communications due to lack of SL resource allocation.

In some of the present implementations, the serving cell may specify part of the SL resource allocations as valid (or invalid). For example, the serving cell may provide an SL-CGInvalidList to invalidate at least one SL-CG configuration. As such, the UE may not apply the invalid SL-CG(s) for SL packet exchange. In some of the present implementations, at least one SL-CG index may be included in the SL-CGInvaidList to invalidate the corresponding SL-CG. In some of the present implementations, the serving cell may provide an SL-CGvalidList to revalidate at least one invalid SL-CG configuration. Therefore, the UE may reapply the revalidated SL-CG(s) for SL packet exchange. In some implementations, at least one SL-CG index may be included in the SL-CGvalidList to revalidate the corresponding SL-CG.

In some of the present implementations, the serving cell may provide an SL-PoolInvalidList to invalidate at least one SL-Pool configuration. As such, the UE may not apply the invalid SL-Pool for SL packet transmission, and at least one SL-Pool index may be included in the SL-PoolInvalidList to in-validate the corresponding SL-Pool. In some of the present implementations, the serving cell may provide an SL-PoolvalidList to revalidate the invalid SL-Pool configuration. Therefore, the UE may reapply the revalidated SL-Pool(s) for SL packet transmission, and at least one SL-Pool index is included in the SL-PoolvalidList to re-validate the corresponding SL-Pool.

It should be noted that, in some of the present implementations, the invalid part of SL resource allocation may still be stored by the UE and/or the RAN, and therefore, the RAN may revalidate the invalid SL resource allocation without a substantial signaling overhead. Conversely, in some other aspects of the present implementations, (part of) the invalid part of the SL resource allocation configuration may be released by the UE and/or the RAN directly (e.g., (part of) the SL resource allocation may be released by the UE after the UE receives the SL-PoolInvalidList or SL-CGInvalidList successfully).

In some of the present implementations, the SL resource allocation (and SL configuration) may be part of the UE context and therefore, the SL resource allocation (and SL configuration) may be forwarded from the source cell to the target cell through a backhaul connection, for example, during a handover procedure. In addition, for a UE in an RRC Inactive state, an anchor base station (e.g., a gNB which is still keeping the UE's NAS connection with the CN) may have stored the SL resource allocation configuration in UE context of the UE. Thus, while the UE is trying to resume the RRC connection with a target cell, which may or may not have been configured by the anchor base station (e.g., in the RAN), the anchor base station may forward the stored UE context with the SL resource allocation configuration to the target cell through a backhaul connection or using the help of the CN.

Figure 11:
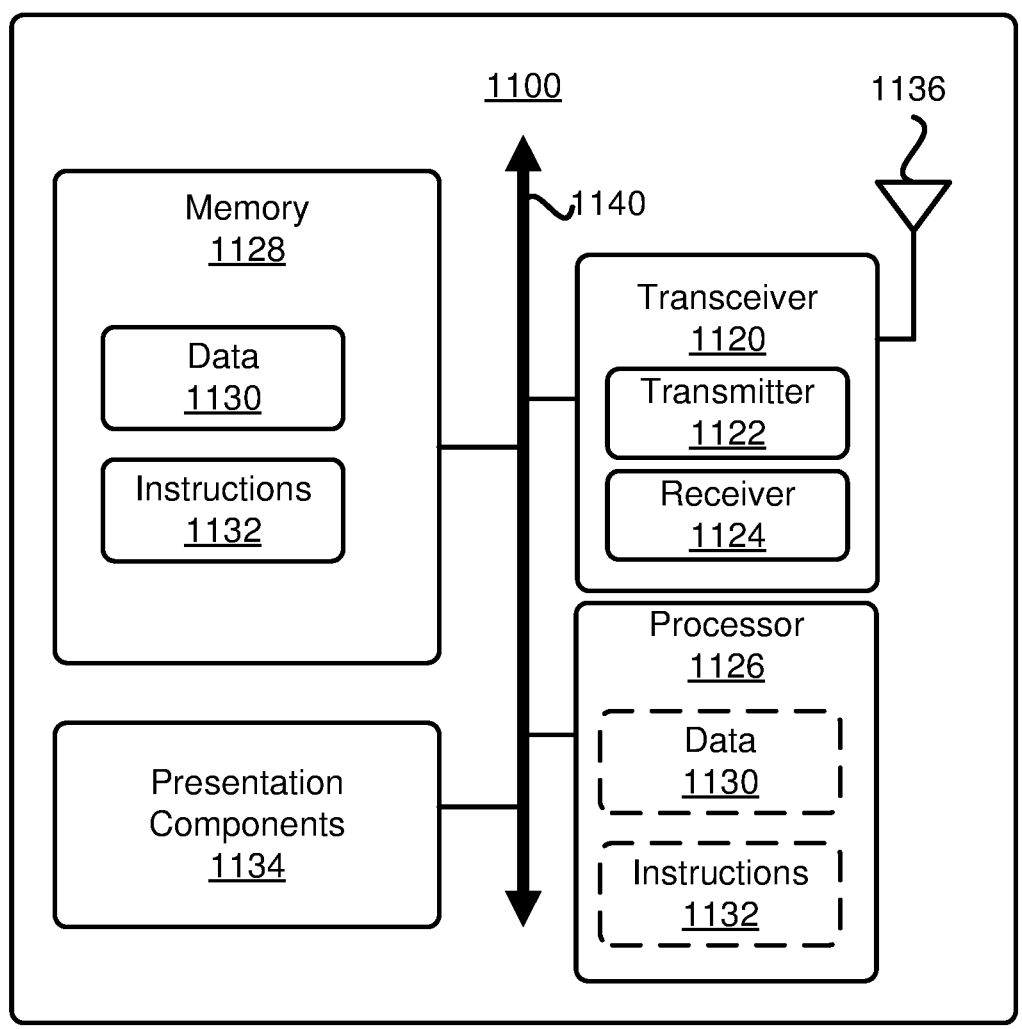
FIG. 11 illustrates a block diagram of a node for wireless communication, in accordance with various aspects of the present application.

FIG. 11 illustrates a block diagram of a node for wireless communication, in accordance with various aspects of the present application. As shown in FIG. 11, node 1100 may include transceiver 1120, processor 1126, memory 1128, one or more presentation components 1134, and at least one antenna 1136. Node 1100 may also include a Radio Frequency (RF) spectrum band module, a base station communications module, a network communications module, and a system communications management module, input/output (I/O) ports, I/O components, and power supply (not explicitly shown in FIG. 11). Each of these components may be in communication with each other, directly or indirectly, over one or more buses 1140.

Transceiver 1120 having transmitter 1122 and receiver 1124 may be configured to transmit and/or receive time and/or frequency resource partitioning information. In some implementations, transceiver 1120 may be configured to transmit in different types of subframes and slots including, but not limited to, usable, non-usable and flexibly usable subframes and slot formats. Transceiver 1120 may be configured to receive data and control signalings.

Node 1100 may include a variety of computer-readable media. Computer-readable media can be any available media that can be accessed by node 1100 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1128 may include computer-storage media in the form of volatile and/or non-volatile memory. Memory 1128 may be removable, non-removable, or a combination thereof. Exemplary memory includes solid-state memory, hard drives, optical-disc drives, and etc. As illustrated in FIG. 11, memory 1128 may store computer-readable, computer-executable instructions 1132 (e.g., software codes) that are configured to, when executed, cause processor 1126 to perform various functions described herein, for example, with reference to FIGS. 1 through 11. Alternatively, instructions 1132 may not be directly executable by processor 1126 but be configured to cause node 1100 (e.g., when compiled and executed) to perform various functions described herein.

Processor 1126 may include an intelligent hardware device, for example, a central processing unit (CPU), a microcontroller, an ASIC, and etc. Processor 1126 may include memory. Processor 1126 may process data 1130 and instructions 1132 received from memory 1128, and information through transceiver 1120, the base band communications module, and/or the network communications module. Processor 1126 may also process information to be sent to transceiver 1120 for transmission through antenna 1136, to the network communications module for transmission to a core network.

One or more presentation components 1134 presents data indications to a person or other device. For example, one or more presentation components 1134 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method by a user equipment (UE) in a radio resource control (RRC) Inactive state, the method comprising:
   triggering an RRC Connection Resume procedure to request a first sidelink resource allocation configuration, after determining that new radio (NR) or long-term evolution (LIE) sidelink system information that comprises second resource allocation configuration and is stored in the UE is still valid, wherein the first sidelink resource allocation configuration comprises one or more UE-specific dedicated sidelink resource configurations on one or more sidelink frequency carriers and is requested to update the stored second resource allocation configuration in the sidelink system information; and
   transmitting an RRC resume request message to a serving cell based on the triggered RRC Connection Resume procedure to move the UE from the RRC Inactive state to an RRC Connected state.

2. The method of claim 1, wherein determining that the new NR or LTE sidelink information is still valid comprises identifying data that specifies a valid area for the UE based on at least one of a set of one or more system information area identifiers or a set of one or more cell identifiers.

3. The method of claim 1, wherein the one or more UE-specific dedicated sidelink resource configurations comprise at least one of an NR sidelink communication transmission resource and an LTE vehicle to everything (V2X) sidelink communication transmission resource on the one or more sidelink frequency carriers.

4. The method of claim 1, wherein:
   the RRC inactive state comprises an NR RRC Inactive state,
   the RRC Resume Request message comprises an NR RRC Resume Request message,
   the serving cell comprises an NR cell, and
   transmitting the RRC resume request message comprises transmitting the NR RRC resume request message to the NR cell when a serving radio access network (RAN) for the UE is an NR-RAN.

5. The method of claim 1, wherein:
the RRC inactive state comprises an Evolved Universal Terrestrial Radio Access (E-UTRA) RRC Inactive state,
the RRC Resume Request message comprises an E-UTRA RRC Resume Request message,
the serving cell comprises an E-UTRA cell, and
transmitting the RRC resume request message comprises transmitting the E-UTRA RRC resume request message to the E-UTRA cell when a serving radio access network (RAN) is an E-UTRA Network (E-UTRAN) RAN.

6. The method of claim 1, wherein the RRC Connection Resume procedure comprises one of a 2-step random access procedure and a 4-step random access procedure.

7. The method of claim 1, wherein a specific cause value for the request for the first sidelink resource allocation configuration is included in the RRC resume request message.

8. A user equipment (UE) in a radio resource control (RRC) Inactive state, the UE comprising:
one or more non-transitory computer-readable media storing computer-executable instructions for scheduling sidelink transmission resources for the UE to exchange one or more sidelink packets with another UE; and
at least one processor coupled to the one or more non-transitory computer-readable media, and configured to execute the computer-executable instructions to:
trigger an RRC Connection Resume procedure to request a first sidelink resource allocation configuration, after determining that new radio (NR) or long-term evolution (LTE) sidelink system information that comprises second resource allocation configuration and is stored in the UE is still valid, wherein the first sidelink resource allocation configuration comprises one or more UE-specific dedicated sidelink resource configurations on one or more sidelink frequency carriers and is requested to update the stored second resource allocation configuration in the sidelink system information; and
transmit an RRC resume request message to a serving cell based on the triggered RRC Connection Resume procedure to move the UE from the RRC Inactive state to an RRC Connected state.

9. The UE of claim 8, wherein determining that the new NR or LTE sidelink information is still valid comprises identifying data that specifies a valid area for the UE based on at least one of a set of one or more system information area identifiers or a set of one or more cell identifiers.

10. The UE of claim 8, wherein the one or more UE-specific dedicated sidelink resource configurations comprise at least one of an NR sidelink communication transmission resource and an LTE vehicle to everything (V2X) sidelink communication transmission resource on one or more sidelink frequency carriers.

11. The UE of claim 8, wherein:
the RRC inactive state comprises an NR RRC Inactive state,
the RRC Resume Request message comprises an NR RRC Resume Request message,
the serving cell comprises an NR cell, and
transmitting the RRC resume request message comprises transmitting the NR RRC resume request message to the NR cell when a serving radio access network (RAN) for the UE is an NR-RAN.

12. The UE of claim 8, wherein:
the RRC inactive state comprises an Evolved Universal Terrestrial Radio Access (E-UTRA) RRC Inactive state,
the RRC Resume Request message comprises an E-UTRA RRC Resume Request message,
the serving cell comprises an E-UTRA cell, and
transmitting the RRC resume request message comprises transmitting the E-UTRA RRC resume request message to the E-UTRA cell when a serving radio access network (RAN) for the UE is an E-UTRA Network (E-UTRAN) RAN.

13. The UE of claim 8, wherein the RRC Connection Resume procedure comprises one of a 2-step random access procedure and a 4-step random access procedure.

14. The UE of claim 8, wherein a specific cause value for the request for the first sidelink resource allocation configuration is included in the RRC resume request message.

\* \* \* \* \*